US005887084A

United States Patent [19]
Wober et al.

[11] Patent Number: 5,887,084
[45] Date of Patent: Mar. 23, 1999

[54] STRUCTURING A DIGITAL IMAGE INTO A DCT PYRAMID IMAGE REPRESENTATION

[75] Inventors: Munib A. Wober, Wakefield; Yibing Yang, Arlington; Ibrahim Hajjahmad, Someville, all of Mass.; Lon E. Sunshine, Machester, N.H.; Michael L. Reisch, Carlisle, Mass.

[73] Assignee: Polaroid Corporation, Cambridge, Mass.

[21] Appl. No.: 966,140

[22] Filed: Nov. 7, 1997

[51] Int. Cl.$^6$ ............................... G06K 9/36; G06K 9/46
[52] U.S. Cl. ........................... 382/250; 382/240; 382/276
[58] Field of Search ..................................... 382/232, 240, 382/248, 250, 254, 260, 266, 276; 358/261.3, 262.1, 432; 348/395, 397, 398, 399, 400, 408

[56] References Cited

U.S. PATENT DOCUMENTS

| | | | |
|---|---|---|---|
| 5,010,504 | 4/1991 | Lee et al. | 382/275 |
| 5,020,120 | 5/1991 | Weldy | 382/240 |
| 5,327,242 | 7/1994 | Naimpally et al. | 348/606 |
| 5,461,655 | 10/1995 | Vuylsteke et al. | 378/62 |

FOREIGN PATENT DOCUMENTS

WO96/36943  11/1996  WIPO ............................... G06T 5/00

OTHER PUBLICATIONS

"The Lapacian Pyramid as a Compact Image Code" by Peter J. Burt & Edward H. Adelson IEEE Transactions on Communications, vol. Com–31, No. 4, Apr. 1983, pp. 532–540.
"Two–Dimensional Signal and Image Processing" by Jae S. Lim, 1990 Prentice–Hall Inc. pp. 527–549 and pp. 562–567.

*Primary Examiner*—Leo H. Boudreau
*Assistant Examiner*—Dmitry A. Novik
*Attorney, Agent, or Firm*—Donald F. Mofford

[57] ABSTRACT

A method or system for structuring an image which corresponds to an original array of pixels, as a forward discrete even cosine transform (DCT) pyramid having a predetermined number of levels where each level is associated with a different DCT frequency band, includes, respectively, the steps or functionality of: partitioning the original array into blocks of overlapped pixels; taking a DCT of each block of overlapped pixels to generate blocks of first level DCT coefficients forming a first level of the DCT pyramid; storing the first level of the DCT pyramid; selecting and storing at least one of the first level DCT coefficients of each block of first level DCT coefficients into a first temporary array; partitioning the first temporary array into blocks of overlapped coefficients; and taking a DCT of each block of overlapped coefficients of the first temporary array to generate blocks of second level DCT coefficients forming a second level of the DCT pyramid. Additional levels can be created by repeating the previous steps, and the processed image can be restored by reversing the above sequence of steps using inverse discrete even cosine transforms.

16 Claims, 17 Drawing Sheets

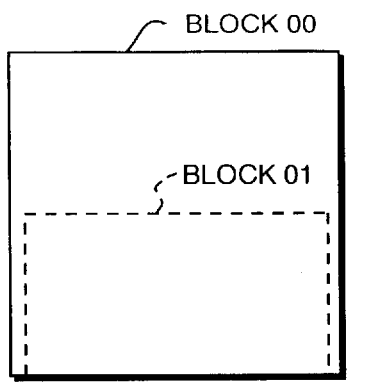
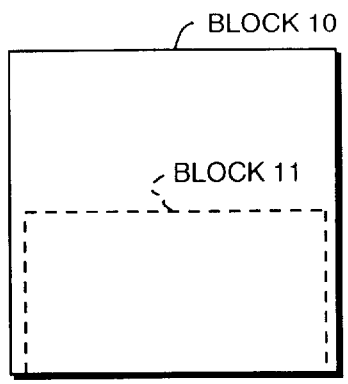
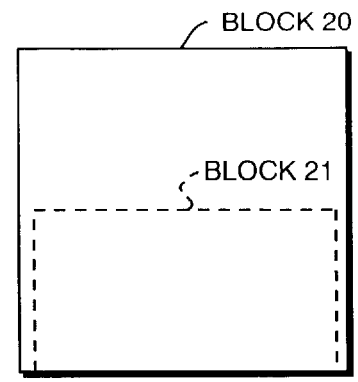
FIG. 14A (PRIOR ART)   FIG. 14B (PRIOR ART)   FIG. 14C (PRIOR ART)
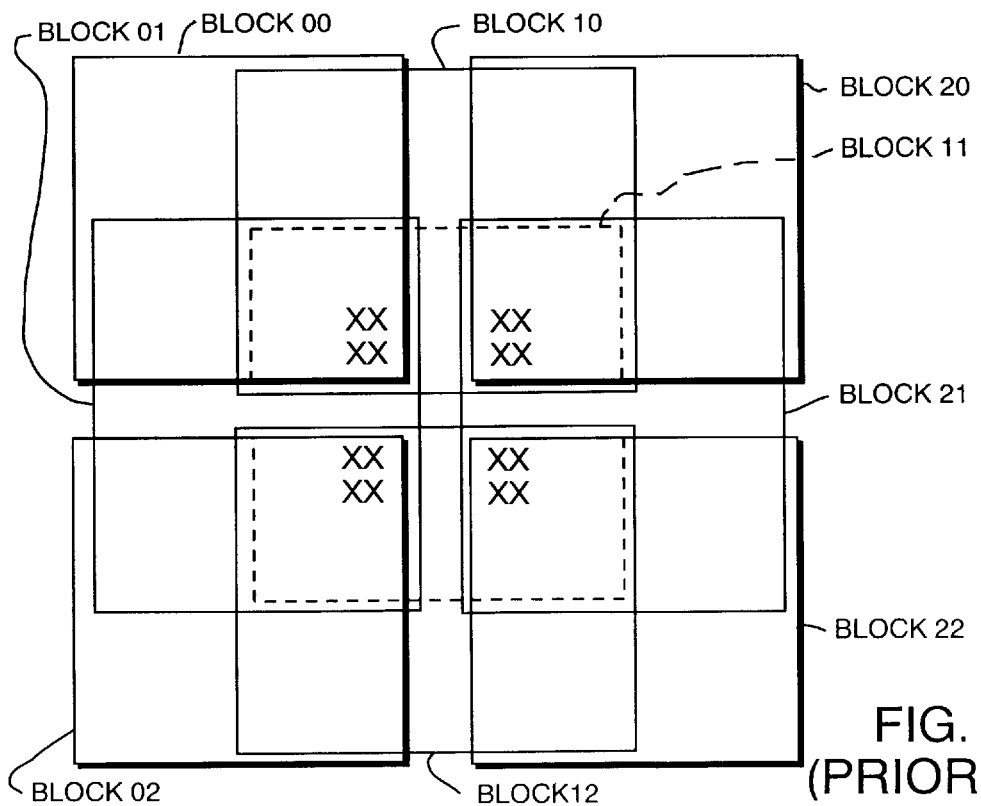
FIG. 15 (PRIOR ART)

STRUCTURING A DIGITAL IMAGE INTO A DCT PYRAMID IMAGE REPRESENTATION

BACKGROUND OF THE INVENTION

The invention relates generally to an improved method and apparatus for preprocessing a digital image and, more particularly, to preprocessing the digital image by generating the image into a multi-level discrete cosine transform (DCT) pyramid image representation where each level of the pyramid is associated with a different DCT frequency band.

It is known in the art to preprocess a digital image by structuring the image into a pyramid representation where each level of the pyramid is thereafter individually processed as by filtering, sharpening, smoothing and edge detection. Pyramid coding is described, for instance, in a book entitled "Two-Dimensional Signal and Image Processing" by Jae S. Lim, 1990 Prentice-Hall Inc., pp. 632–670, which is herein incorporated by reference to provide supplemental background information which is not essential but is helpful in appreciating the applications of the present invention.

Preprocessing of an image is frequently followed by the reduction or elimination of unwanted artifacts, i.e. noise removal, which in turn is followed by image restoration. Typically, a captured image includes noise inherent in an image signal source, e.g. a camera, scanner, charge-coupled device (CCD), charge-injected device (CID), or the like. Equation (1) mathematically expresses a degraded image or noisy signal $x(n_1,n_2)$ as the addition of noise $v(n_1,n_2)$ to the original signal $s(n_1,n_2)$, as modeled in FIG. 3A.

$$x(n_1,n_2)=s(n_1,n_2)+v(n_1,n_2) \quad (1)$$

If $v(n_1,n_2)$ is a function of the signal $s(n_1, n_2)$, then $x(n_1,n_2)$ is additive random signal dependent noise (hereinafter "signal dependent noise"), otherwise if $v(n_1,n_2)$ is not dependent upon $s(n_1,n_2)$, then $x(n_1,n_2)$ is additive random signal independent noise (hereinafter "additive noise"). Each of the signals $x(n_1,n_2)$, $s(n_1,n_2)$ and $v(n_1,n_2)$ represents a physical electronic signal, i.e. a waveform of voltages having amplitudes and frequencies related as a function of time.

Examples of signal dependent noise are film grain noise, speckle noise and quantization noise. Signal dependent noise, which is much more difficult to reduce than additive noise, can be reduced by first transforming the noisy signal $x(n_1,n_2)$ into a domain where the noise becomes signal independent, then removing the signal independent noise using a conventional method such as Wiener filtering. Signal dependent noise can also be reduced directly in the spatial domain.

One approach to removing additive noise is disclosed in U.S. Pat. No. 5,337,180 issued 9 Aug. 1994 to Woods et al. which describes optical signal dependent noise reduction by variable spatial thresholding of the fourier transform. Another approach to removing additive noise is disclosed in U.S. Pat. No. 5,327,242 issued 5 Jul. 1994 to Naimpally et al. which describes the reduction of a noise component of a video signal using a three dimensional discrete cosine transform to determine the time frequency spectrum of both the video signal and the noise component, subtracting the time frequency spectrum of the noise component from the time frequency spectrum of the video signal, and converting the time frequency spectrum of the modified video signal back to the spatial domain by using an inverse three dimensional discrete cosine transform. The above two patents are incorporated by reference in their entirety to provide supplemental background information which is not essential but is helpful in appreciating the applications of the present invention.

The book by Jae S. Lim, supra, pp. 527–549, describes additional methods for reducing additive noise, including Wiener filtering and adaptive image processing. Reduction of signal dependent noise is also described on pages 562–567 for processing the noisy signal directly in the signal domain or by first transforming the noisy signal into another domain, then processing for noise reduction. The above pages of the Lim book are herein incorporated by reference for non-essential background information which is helpful in appreciating the applications of the present invention.

It is a primary object of the current invention to provide a system and method for preprocessing a digital image into a multi-level DCT pyramid image representation where each level of the pyramid is associated with a different DCT frequency band and whereby each level of the multi-level DCT pyramid image representation can be further processed, as by filtering, sharpening, smoothing, edge detection, etc.

The above and other objects of the invention will be apparent to those skilled in the art from the following detailed description when read in conjunction with the accompanying drawings and appended claims.

SUMMARY OF THE INVENTION

A method or system for structuring an image which corresponds to an original array of pixels, as a forward discrete even cosine transform (DCT) pyramid having a predetermined number of levels where each level is associated with a different DCT frequency band, includes, respectively, the steps or functionality of: partitioning the original array into blocks of overlapped pixels; taking a DCT of each block of overlapped pixels to generate blocks of first level DCT coefficients forming a first level of the DCT pyramid; storing the first level of the DCT pyramid; selecting and storing at least one of the first level DCT coefficients of each block of first level DCT coefficients into a first temporary array; partitioning the first temporary array into blocks of overlapped coefficients; and taking a DCT of each block of overlapped coefficients of the first temporary array to generate blocks of second level DCT coefficients forming a second level of the DCT pyramid. Additional levels can be created by repeating the previous steps.

When restoring an image which has been structured into two levels of a DCT pyramid, the steps or functionality include: taking an inverse discrete even cosine transform of each block of second level DCT coefficients which form the second level of the DCT pyramid, to generate blocks of second level IDCT coefficients; discarding border regions and storing saved regions of the blocks of second level IDCT coefficients into a modified first temporary array to compensate for the overlapping of coefficients in the first temporary array; retrieving the stored blocks of first level DCT coefficients; inserting preselected components of the modified first temporary array, corresponding to the at least one of the first level DCT coefficients into the retrieved blocks of first level DCT coefficients to generate modified, retrieved blocks; taking an inverse discrete even cosine transform of each modified, retrieved block to generate blocks of first level DCT coefficients; and discarding border regions and storing saved regions of the blocks of first level IDCT coefficients into a modified original array corresponding to a processed and restored the image.

BRIEF DESCRIPTION OF THE DRAWINGS

FIGS. 14A, 14B and 14C represent vertical overlapping of blocks from FIG. 12;

FIG. 15 illustrates overlapping of all the blocks of FIG. 12 in both the horizontal and vertical directions.

DETAILED DESCRIPTION OF THE PREFERRED EMBODIMENTS

Figure 1:
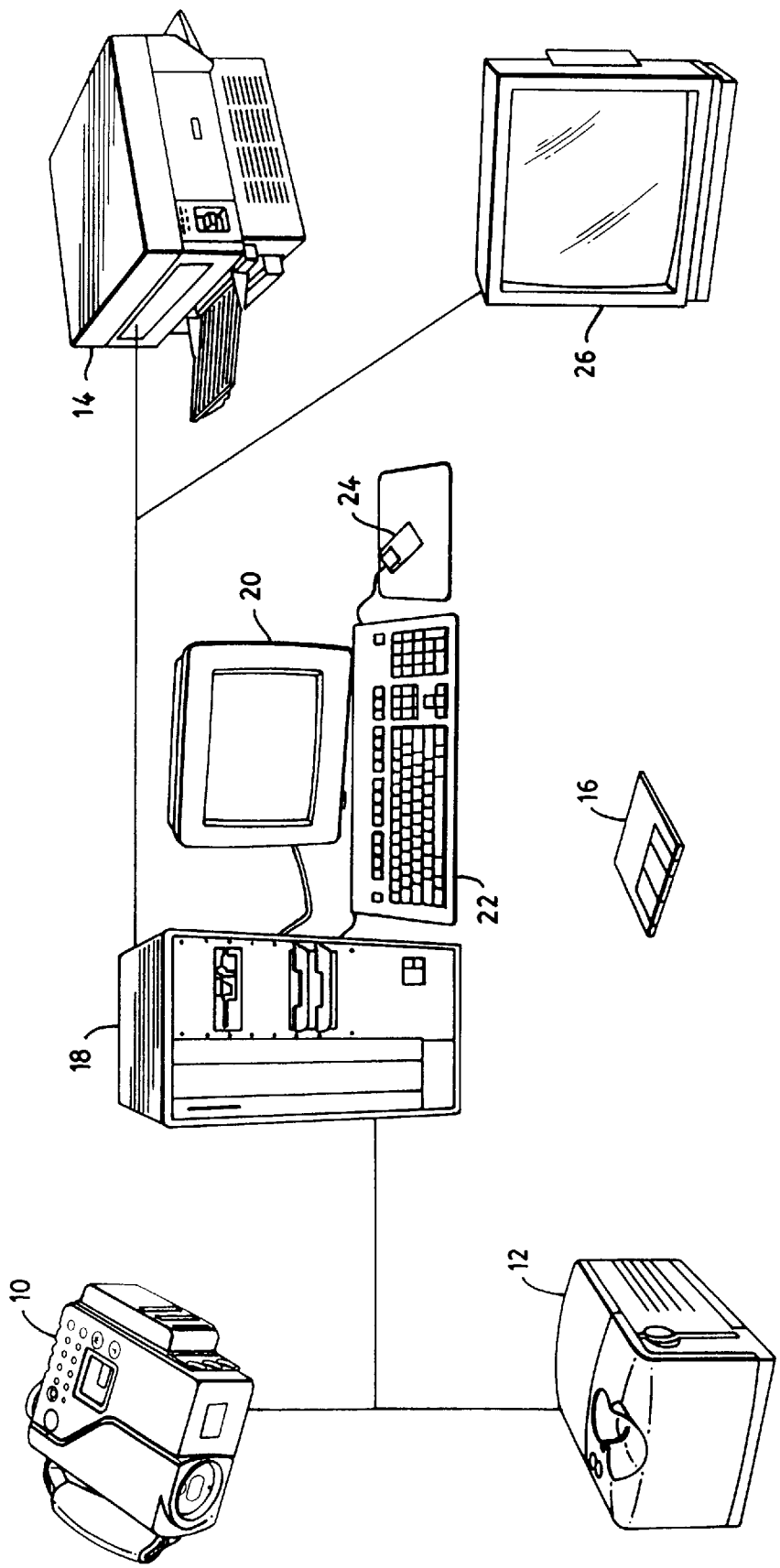
FIG. 1 is a block diagram of a preferred embodiment of an electronic imaging system for implementing the current invention.

A noise modeling and filtering system for reducing both additive and signal dependent noise from a noisy image signal is illustrated in FIG. 1. An image signal source, such as an electronic still camera 10 or a scanner 12, provides an electronic image signal which represents an image of the subject (not shown). A computer 18 receives the electronic signal from the image signal source and thereafter processes the image signal electronically to provide any number of known image processing functions. The processed image is then transmitted, i.e. output, to a destination device or destination application such as a diskette 16, an user monitor 20, a printer 14, or a remote monitor 26. Operator interaction with the system is facilitated by use of a keyboard 22 or a mouse 24. It should be noted that the components shown in FIG. 1 are exemplary rather than all inclusive of the many equivalent devices known by those skilled in the art. For instance, any image signal source could be used, such as an electronic camera, a scanner, a camcorder, a charge coupled device (CCD), a charge injected device (CID), etc. Also, the processing of the image need not necessarily occur solely in the computer 18. Indeed, various phases or aspects of the image processing could occur in the image signal source, the computer, or the destination output device.

In order to fully appreciate the claimed invention, the following explanations on discrete cosine transform mathematics and Wiener noise filtering will be helpful.

1. DCT Mathematics

Images can be thought of as two-dimensional representations of some visual reality that is distributed in space and/or time. Ordinarily, they are what the human visual system perceives as variations in external stimuli such as brightness, color, and sometimes depth cues. While over the years many techniques have been developed to capture and reproduce images, their representation as continuous, discrete, or digital signals which can be manipulated, processed or displayed through the use of computers or other special purpose electronic hardware is now common.

Image processing can occur in either the spatial domain or the frequency domain. An image is said to reside in the spatial domain when the values of the parameters used to describe it, such as brightness, have a direct correspondence with spatial location. In the frequency domain, the corresponding image from the spatial domain may be represented by a series of frequency components in the form of trigonometric functions which, when summed for each image data point (i.e., pixel) yield the value of the parameter used to characterize the image of that point in the spatial domain, and such a representation may be extended to cover all points of an image.

In the spatial domain, original image data may be conveniently represented as image data points in a first spatial matrix designated, $s(j,i)$, for the two-dimensional case where the lower case, s, designates the spatial domain, i is the index of rows and j is the index of columns. In the frequency domain, matrices can also be used to mathematically describe an image as a set of the transform coefficients (also referred to as frequency coefficients) which represent frequency data in a transform matrix conventionally designated, $S(v,u)$, where the upper case, S, designates the frequency domain and, u is the index of rows and v is the index of columns.

Spatial image data points may be transformed to frequency space using transformations such as Fourier transforms or discrete even cosine transforms. When the transformation involved is a discrete cosine transformation, the frequency domain is referred to as the DCT domain and the frequency coefficients are referred to as DCT coefficients. Conventionally, transforming data from the spatial domain to the frequency domain is referred to as a forward transformation, whereas transforming data from the frequency domain to the spatial domain is referred to as an inverse transformation. Hence, a forward discrete even cosine transformation is defined as a transform that maps an image from the original image data points $s(j,i)$ in the spatial domain to DCT coefficients $S(v,u)$ in the DCT domain according to the basis function of the forward DCT, whereas an inverse discrete even cosine transformation (or IDCT) is defined as a transform that maps the DCT coefficients S(v,u) from the DCT domain to reconstructed image data points ŝ(j,i) in the spatial domain according to the basis function of the IDCT.

An image is typically made up of a two-dimensional PxQ array of descriptors called pixels or image data points, where P is the number of rows and Q is the number of columns representing the image. The image can be represented by either image data points in the spatial domain, or by DCT coefficients in the frequency domain. A forward DCT generates the DCT coefficients by taking a discrete even cosine transformation of the image data points. Conversely, an inverse discrete even cosine transformation generates the IDCT coefficients (i.e. reconstructed image data points) by taking an inverse discrete even cosine transformation of the DCT coefficients.

A DCT transformation can occur in any number of dimensions as understood by those-skilled in the art. In the following one-dimensional example, a row (more generically referred to as a segment) of N image data points s(j) can be transformed from the spatial domain to corresponding DCT coefficients S(v) in the frequency domain in accordance with equation (2).

$$S(v) = Cv\sqrt{\frac{2}{N}} \sum_{j=0}^{N-1} s(j)\cos\frac{(2j+1)v\pi}{2N} \quad (2)$$

where:

0≤v≤(N-1), v an integer;

s(j) represents the matrix of image data points in the segment;

S(v) represents the corresponding matrix of DCT coefficients;

N represents the number of image data points in the segment;

$$C_v = \frac{1}{\sqrt{2}} \text{ for } v = 0; \text{ and}$$

$C_v$=1 for v≠0.

The DCT coefficients S(v) are determined from equation (2) where the normalized cosine basis terms are derived for a segment having N image data points. The value for S(0) is determined for v=0 by summing each of the image data points (j) for 0≤j≤(N-1) times the cosine terms of the basis function. The value for S(1) is determined as the summation of image data points s(j) times the cosine terms for v=1. This procedure, which indexes first on v and then on j, is repeated for derivation of DCT coefficients S(0) through S(N-1).

A modified inverse discrete cosine transformation is mathematically defined in equation (3) where the one-dimensional matrix S(v) of DCT coefficients is transformed to a reconstructed matrix ŝ(y) of reconstructed image data points, and y is defined as a real number within the given range as disclosed in U.S. patent application Ser. No. 08/427,457 filed May 18, 1995 by Wober and Reisch which, in turn, is a file wrapper continuation application of abandoned U. S. patent application Ser. No. 08/159,795.

$$s(y) = \sqrt{\frac{2}{N}} \sum_{v=0}^{N-1} C_v S(v)\cos\frac{(2y+1)v\pi}{2N} \quad (3)$$

where:

0≤y≤(N-1), y a real number;

S(v) represents the matrix of DCT coefficients;

ŝ(y) represents the spatial matrix of reconstructed image data points;

N represents the number of image data points in the segment;

$$C_v = \frac{1}{\sqrt{2}} \text{ for } v = 0; \text{ and}$$

$C_v$=1 for v≠0.

If the DCT coefficients S(v) of equation (2) are computed from a set of image data points s(j) and the reconstructed image data points ŝ(y) of equation (3) are computed from the corresponding DCT coefficients S(v), then s(j)≡(y) when y=j, and the process is referred to as invertible or one-to-one mapping since the reconstructed image data points of ŝ(y) are identical, within limits, to the original image data points of s(j). By evaluating y in equation (3) at other (non-integer) values where 0≤y≤(N-1), a modified IDCT is obtained which can be used for various processes such as the interpolation of values falling between discrete image data points which represent an image.

In determining the values representing the reconstructed image data points ŝ(y) using equation (3), ŝ(0) is determined by summing each of the DCT coefficients S(v) times the cosine terms of the inverse basis function for y=0. For example, the value for ŝ(0.5) is determined as the summation of DCT coefficients S(v) times the cosine terms for y=0.5. This procedure, which indexes first on y then on v, is repeated for derivation of all desired reconstructed image data points ŝ(y) where 0≤y≤(N-1).

As earlier noted, the above mathematics can be readily expanded to multiple dimensions as known by one of ordinary skill in the art. For instance, an image can be represented in the spatial domain in two-dimensional format as described in U.S. patent application Ser. No. 08/427,457, where s(j,i) represents the image data points in the spatial domain, S(v,u) represents the corresponding DCT coefficients in the frequency domain, i represents the row number from 0 to (P-1), j represents the column number from 0 to (Q-1), P represents the total number of rows, and Q represents the total number of columns. The image data points s(j,i) may represent, but are not limited to, parameters such as brightness, luminance, color or hue.

Both equations (2) and (3) can alternatively be expressed in matrix notation. The matrix notation (without indices) for equation (2) is:

$$S = FB \times s \quad (4)$$

where S represents the matrix of DCT coefficients, s represents the matrix of image data points in the spatial domain, and FB represents the forward DCT basis matrix. Throughout this document, the operator "x" represents matrix multiplication. The matrix notation for equation (3) is:

$$\hat{s} = IB \times S \quad (5)$$

where ŝ represents the spatial matrix of reconstructed image data points, and IB represents the inverse DCT basis matrix for the desired output points (i.e. reconstructed image data points). Combining matrix equations (4) and (5) will reduce the number of arithmetic operations as opposed to performing the matrix algebra in two different steps as previously described. Combining matrix equations (4) and (5) yields:

$$\hat{s} = IB \times (FB \times s) = MB \times s \quad (6)$$

where MB is a combined DCT basis matrix derived from matrix multiplication of the inverse DCT basis matrix IB times the forward DCT basis matrix FB. The combined DCT basis matrix MB can be contemporaneously calculated while solving equation (6), or MB can be precalculated and stored in a look-up table.

2. Wiener Filtering

Figure 3A:
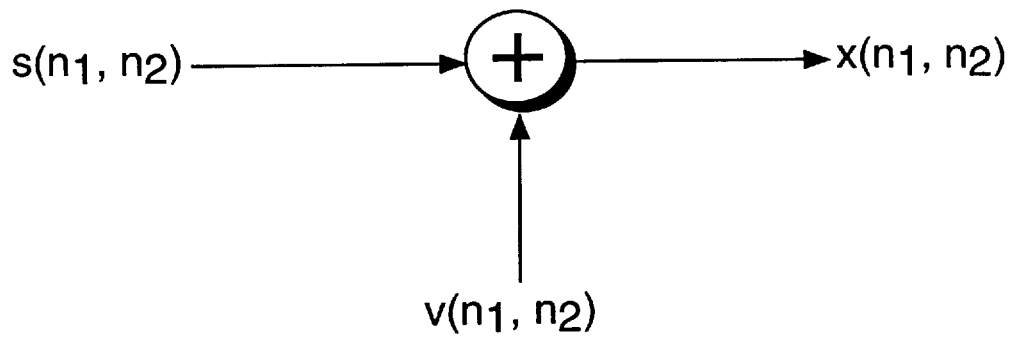
FIG. 3A is a schematic representation of an image subjected to additive noise.
Figure 3B:
FIG. 3B is a block diagram of a noisy image processed by a Wiener filter.

In the image noise removal literature, various image restoration methods have been described depending upon the type of degradation or noise and the way in which that degradation was modeled and estimated. The well known Wiener filter 300 (see FIG. 3B) was designed, according to the criterion of the lowest mean square error, as the single best filter for removing additive noise $v(n_1,n_2)$ from the noisy signal $x(n_1,n_2)$ to produce the restored signal $ŝ(n_1,n_2)$ which most closely represents the original image signal $s(n_1,n_2)$. The resulting optimum filter, labeled a non-causal Wiener filter, can be expressed as shown in equation (7), assuming that both the image signal $s(n_1,n_2)$ and the noise signal $v(n_1,n_2)$ are zero-mean, and the noise is uncorrelated, stationary and random.

$$H(\omega 1, \omega 2) = \frac{Ps(\omega 1, \omega 2)}{Ps(\omega 1, \omega 2) + Pv(\omega 1, \omega 2)} \quad (7)$$

where $H(\omega_1, \omega_2)$ is the Fourier transform of the desired filter impulse response $h(n_1,n_2)$, and $P_s(\omega_1, \omega_2)$ and $P_v(\omega_1, \omega_2)$ are the power spectra of the image signal $s(n_1,n_2)$ and the noise signal $v(n_1,n_2)$, respectively.

One variation of the Wiener filter, known as the power spectrum filter, exhibits the following frequency response:

$$H(\omega 1, \omega 2) = \left( \frac{Ps(\omega 1, \omega 2)}{Ps(\omega 1, \omega 2) + Pv(\omega 1, \omega 2)} \right)^{1/2} \quad (8)$$

Equation (8) is equal to the frequency response of the Wiener filter raised to the power ½. The frequency response of a generalized Wiener filter is represented as:

$$H(\omega 1, \omega 2) = \left( \frac{Ps(\omega 1, \omega 2)}{Ps(\omega 1, \omega 2) + \alpha Pv(\omega 1, \omega 2)} \right)^{\beta} \quad (9)$$

where $\alpha$ and $\beta$ are variables which can be empirically determined for specific applications. Actually, the generalized Wiener filter of equation (9) encompasses both the Wiener filter of equation (7) (for $\alpha=1$ and $\beta=1$) and the power spectrum filter of equation (8) (for $\alpha=1$ and $\beta$½).

In current practice, the use of a single restoration filter throughout the whole image is often undesirable since the characteristics of both the image and the noise can change considerably throughout different regions of the image. For example, the amount of noise in the system might be greater for dark regions than for bright regions, thus demanding a more adaptive noise removal scheme. Adaptive schemes can, of course, vary according to the frequency of adaptation and the local characteristics that are employed to control the amount of adaptation in the restoration algorithm.

3. Wiener Noise Modeling Hardware

Figure 2:
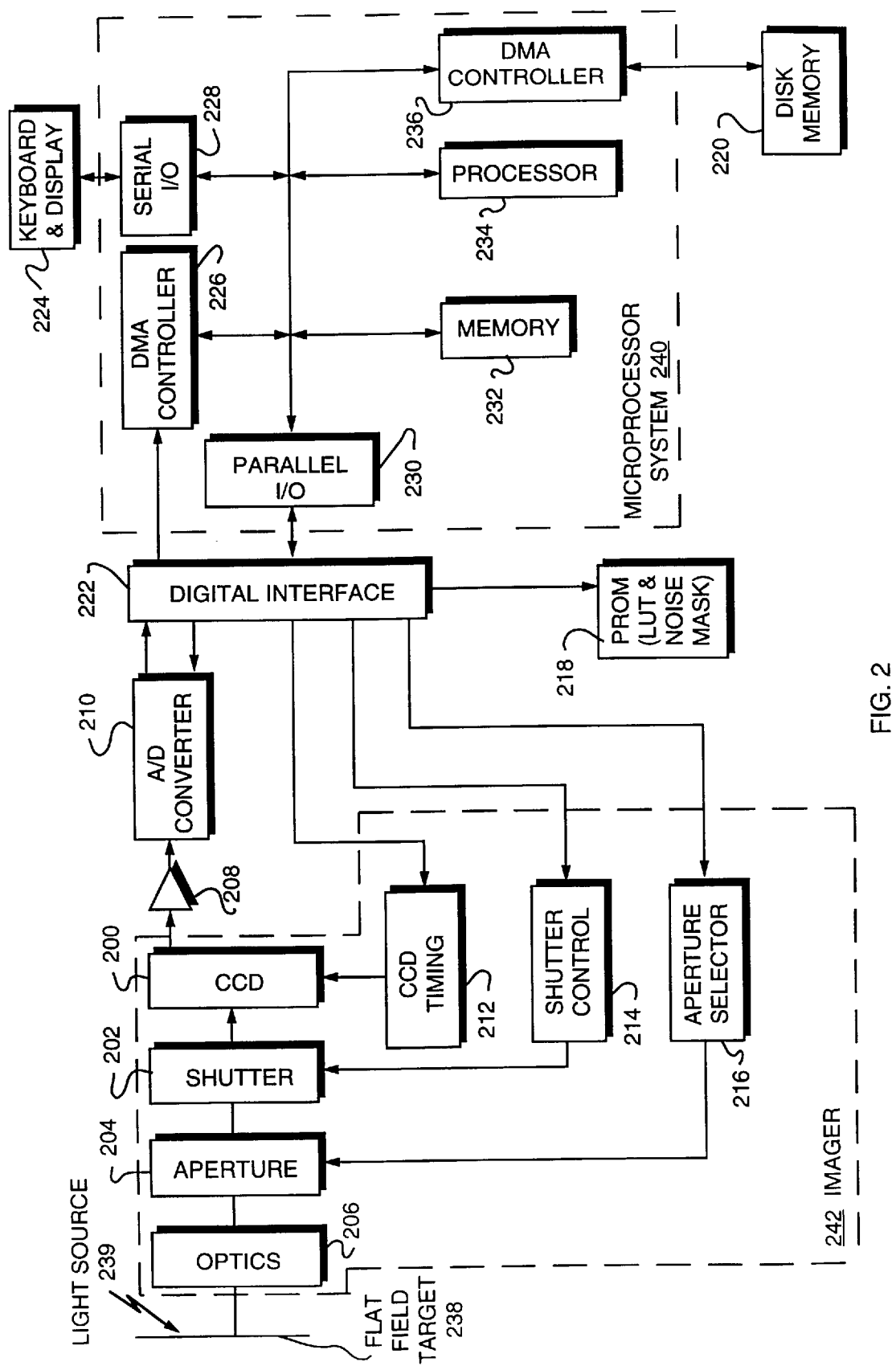
FIG. 2 is a detailed schematic block diagram of the system of FIG. 1 for noise modeling.

The Wiener noise modeling system of FIG. 2 depicts essential elements needed to characterize a Wiener noise mask for a CCD imager. The system includes: a CCD imager (i.e. an image signal source) 242; a video preamplifier 208; a high speed analog to digital converter 210; a parallel digital interface 222; a programmable read only memory (PROM) 218; and a microprocessor 240. The system also includes a disk memory 220, a flat-field target 228 (i.e. a gray, colorless target of uniform illumination); and a keyboard and display 224. The CCD imager 242 consists of optics 206, aperture 204, aperture selector 216, shutter 202, shutter control 214, CCD 200 and CCD timing circuitry 212.

The microprocessor 240 consists of two direct memory access (DMA) controllers 226 and 236, a parallel input/output port 230, a serial input/output port 228, a memory 232 and a processor 234. The optics 206 images the flat-field target 238 onto the active area of the CCD 200. The flat-field target 238 is illuminated by a light source 239 having a fixed and stable intensity with known spectral characteristics.

The brightness at the CCD 200 is adjustable via the aperture 204 to span the illuminance dynamic range of the imager 242. The shutter speed of the shutter 202 is controlled by shutter controller 214 to change the light exposure time for the CCD 200. The timing for the CCD phases is generated by an independent clock circuit (not shown) triggered from the digital interface. The analog output signal of the imager 242 is buffered, sampled and digitized by the video preamplifier 208. The samples are then sequentially transferred into the memory 232 of the microprocessor 240 through the digital interface 222 in concert with a first direct memory access (DMA) controller 226. The memory 232 is capable of storing an entire CCD frame as well as software for control, data acquisition, and signal processing. Data and software backup files are stored on the disk drive 220 which transfers data to main memory 232 by means of a second DMA controller 236. Operator commands, programs, and system status are available from the keyboard and display terminal 224.

The CCD 200 is characterized for various luminance levels for noise which is signal level dependent. Tests have shown that ten flat fields corresponding to ten brightness levels are adequate to completely describe the noise behavior of the CCD 200, although a variable number of flat fields could be used. A measurement cycle begins when the aperture selector 216 selects a predetermined aperture 204 and the shutter control 214 controls the shutter speed of the shutter for producing the lowest useable output level of the CCD 200. The CCD timing circuit 212 is enabled and the video from the preamp 208 is sampled and digitized in analog to digital converter 210. The output of the analog to digital converter 210 passes through the digital interface 222 to the direct memory access controller 226 to keep the transfer rate at a maximum. This reduces noise by minimizing the time period during which charge is able to build up in the charge wells of the CCD 200. At the conclusion of video frame acquisition the red, green and blue (RGB) pixel values, which have been stored in memory 232, are converted in the microprocessor 240 to luminance chrominance (YUV) space. The YUV components are processed separately as described in the following section entitled "Operation of the Noise Modeling System". At the end of each measurement cycle the processed noise mask and corresponding luminance level are stored to either disk 220 or PROM 218. The next cycle begins by selecting a new luminance level and repeating the above procedure. After measuring the noise of ten flat fields corresponding to ten luminance levels, the masks and luminance data are stored in the lookup tables (LUT) 714 and 732, respectively.

4. Operation of the Noise Modeling System of FIG. 2

Each type of image signal source exhibits specific noise characteristics or properties for each luminance and chrominance channel. In other words, noise modeling is a process of camera calibration whereby each luminance and chrominance channel should be separately modeled for noise removal. In attempting to remove the noise residing in an image, it is important to characterize the noise quantitatively so that the noise model can be used with conventional filtering devices such as a Wiener filter.

Assuming that the noise is stationary, the noise power spectrum, $P_v$, which is generally dependent upon the brightness of the scene, can be used to characterize the noise. In fact, the integral of the power spectrum represents the variance of the intensity of the image. Notably, different chromatic channels usually have different power spectra.

Figure 4:
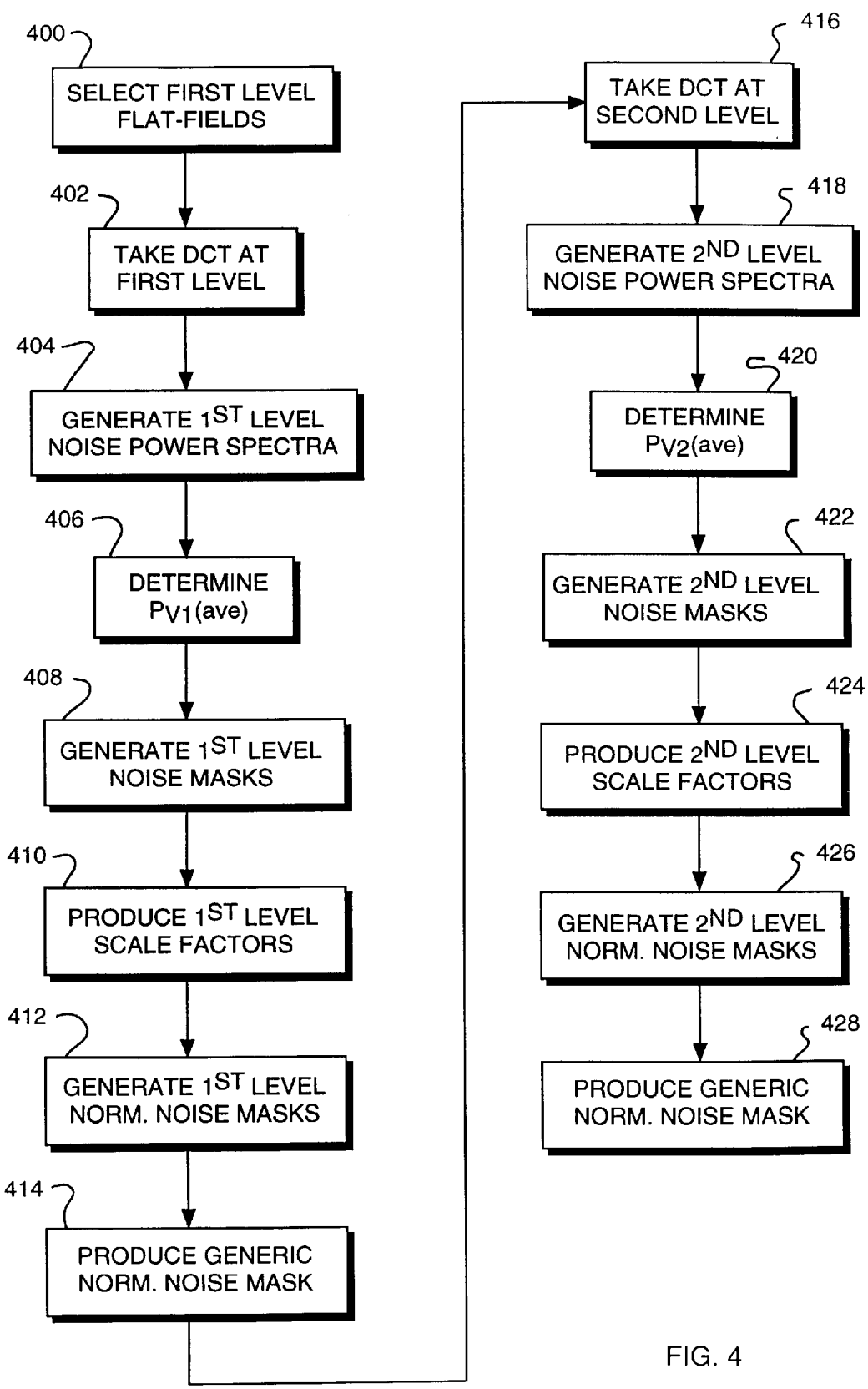
FIG. 4 is a block diagram of a noise modeling method applicable to the noise modeling system of FIG. 1.

The steps involved in a preferred noise modeling method, applicable to the Wiener noise modeling system of FIG. 2, are shown in FIG. 4. In block 400, a plurality of flat-fields are selected at a first level to span the brightness range (typically 0 to 255) of the image signal source. A flat-field is defined as an image of a gray, colorless object of uniform brightness. As an example, one flat-field could have red, green and blue channels (RGB) with values of R=G=B=200 which corresponds to YUV luminance and chrominance channels having values of Y=200 and U=V=0. Another flat-field could have R=G-B=100, Y=100, and U=V=0. In either case, the object of the image ideally exhibits both a constant brightness, i.e. luminance value, and the absence of color. However, due to the introduction of noise which is inherent in any imaging device, a flat-field will not actually exhibit constant luminance and chrominance values. Rather, the Y luminance channel will consist of a constant luminance value plus noise and the U and V chrominance channels will consist of zero-mean random noise. In other words, the brightness of the luminance signal or the chrominance signal of a flat-field will fluctuate due to the noise component.

It has been empirically determined that ten flat-fields adequately sample the 0 to 255 brightness range of many image signal sources for noise modeling, although a different number of flat-fields can be selected for specific applications if desired. However, care should be taken to sample the complete brightness range of interest. In the current example, ten flat-fields are arbitrarily selected corresponding to brightness levels of 0, 25, 50, 81, 115, 144, 169, 195, 220 and 255.

In block 402, each flat-field is subdivided into 8×8 first segments which are overlapped to prevent blocking artifacts from appearing therebetween. A forward DCT is performed on each overlapped first segment to yield 8×8 first level DCT arrays $S_1(v,u)$ of DCT coefficients which are useful in characterizing the noise in the flat-field. The 8×8 first segment size is selected for compatibility with standard image processing hardware, and the term "first segment" is used throughout this application to signify any first level segment. The first element S(0,0) of each 8×8 array S(v,u) of DCT coefficients is characterized as the direct current or DC coefficient, and the other elements of S(v,u) are characterized as alternating current or AC coefficients. First level modified DCT arrays $S_{mod1}(v,u)$ are generated by setting the DC coefficients in arrays $S_1(v,u)$ to zero. In block 404, a DCT noise power spectrum $P_v$ is generated for each first segment of each flat-field by squaring each of the 64 modified DCT coefficients $S_{mod1}(v,u)$ of each first segment. An average first segment power spectrum $P_v(ave1)$ is generated for each first level flat-field in block 406 by averaging corresponding elements of each first segment power spectrum in each first level flat-field. In other words, if a first level flat-field was partitioned into 256 first segments with each first segment being represented as an 8×8 array, then each array element at (0,1) would be summed and divided by 256 to determine the average array element at (0,1), each array element at (0,2) would be summed and divided by 256 to determine the average array element at (0,2), etc. In block 408, a first level noise mask is generated for each first level flat-field by taking the square root of each element of the average first segment power spectrum for each first level flat-field.

The first level noise masks, neglecting the DC elements, are similar in shape. Thus, each first level noise mask of a particular flat-field differs from that of another only by a first level scale factor or LUT value, which is generated in block 410 for each first level flat-field by squaring each element of each first level noise mask, summing the squared elements of each first level noise mask, dividing the sum by 64 to produce a quotient, then taking the square root of the quotient.

The first level LUT value is determined as a comparison of the mean luminance value of any individual flat-field to the mean luminance value of the average noise mask for that flat-field. The correlation between noise masks can be expressed as $$M_u = L(u)M \qquad (10)$$

where:

$M_u$ represents the individual noise mask for the flat-field having a mean luminance value of u;

M represents a normalized noise mask; and

L(u) represents a LUT value dependent upon u.

In the current example, ten u values corresponding to the ten selected flat-fields are stored in a first level lookup table.

A typical image signal source is characterized by 256 different luminance levels and since only ten of the possible 256 luminance levels are empirically derived for the ten flat-fields selected, the other 246 luminance levels can be approximated by determining an interpolated scale factor between appropriate adjacent scale factors in the first level lookup table. Hence, a noise mask for any brightness level can be generated by multiplying either a stored or interpolated scale factor times the generic normalized noise mask. In this way, the generic normalized noise mask can be modeled to accurately gauge any brightness level for a given image signal source.

Prior to producing the first level generic normalized noise mask, a normalized first level noise mask for each first level flat-field must be generated in block 412. Each element of each first level noise mask generated in block 408 is divided by the corresponding first level LUT value, that is, the scale factor generated for the respective first level flat-field. Then, in block 414, the generic normalized first level noise mask is generated by averaging corresponding elements of each of the normalized first level noise masks. In other words, the DC element is zero, the element at (0,1) is determined by adding each of the elements at (0,1) from the ten flat-fields then dividing by ten, the element at (0,2) is determined by adding each of the elements at (0,2) from the ten flat-fields then dividing by ten, etc.

Figure 5A:
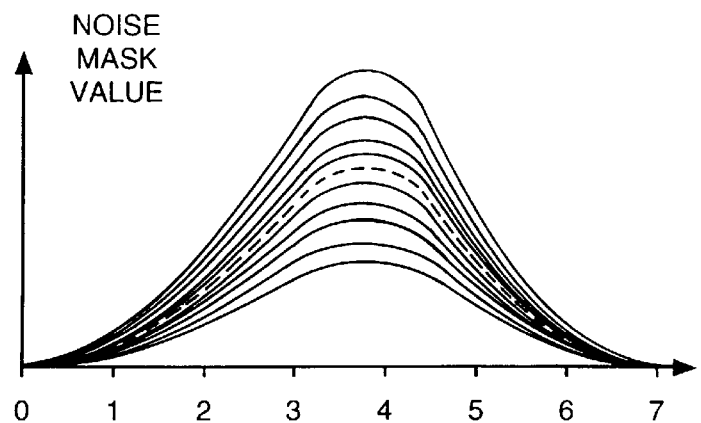
FIG. 5A is a one-dimensional graphical representation of eight bit noise masks for ten flat-fields used for noise modeling in the system of FIG. 2 according to the method of FIG. 3.
Figure 5B:
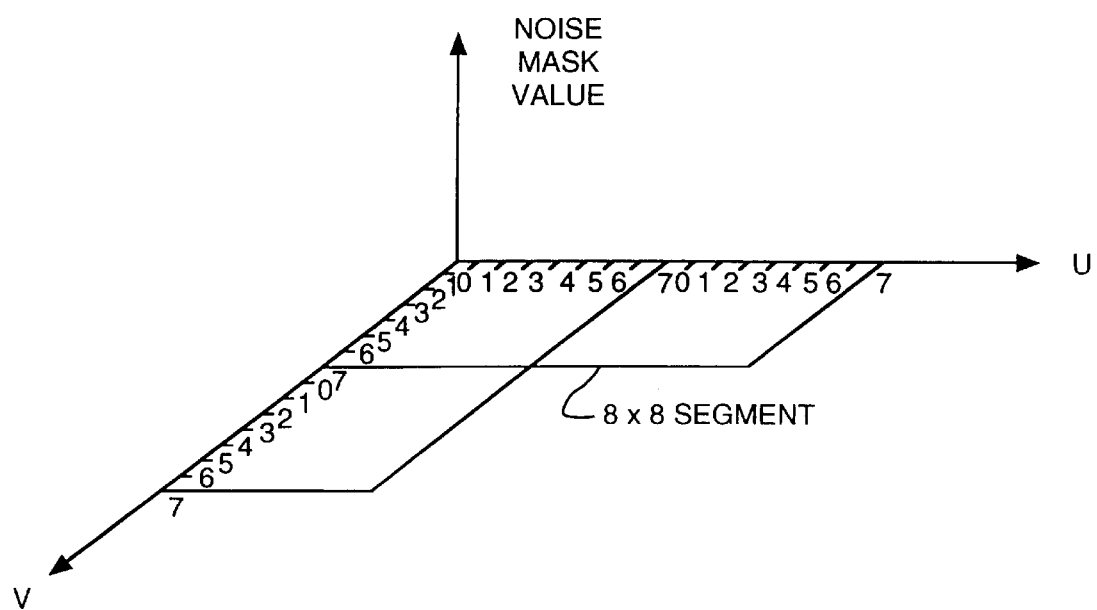
FIG. 5B is a two-dimensional representation of a graph for plotting 8×8 bit noise masks according to the noise modeling method of FIG. 4.

As indicated earlier, the noise content in each flat-field imaged by the image signal source is dependent upon the brightness level of the object, i.e. the brightness level is defined by the mean luminance value of the flat-field which is stored as the DC component of each individual noise mask. As a result the noise in each flat-field varies, so that each flat-field includes a distinct noise signal component to be removed by the individual first level noise mask having a distinct mean luminance value. As earlier stated, the first level noise masks, neglecting the DC components, are similar in shape. For example, the graph of FIG. 5A plots first level normalized noise masks derived from ten flat-fields plus a generic normalized noise mask (indicated by the dotted line) as a function of the noise mask value versus the index v for each element of an eight point first segment represented as an 8×1 matrix. More realistically, a first level normalized noise mask would be modeled in two dimensions on a graph similar to the one illustrated by FIG. 5B, although the noise modeling techniques described herein could readily be expanded to any number of dimensions as understood by those of ordinary skill in the art. FIG. 5B shows three perpendicular axes for plotting a two dimensional first level normalized noise mask as the noise mask value versus DCT indices u and v which, in turn, extend to the limits of P and Q, respectively, in defining the predetermined size of the image. Each of the above parameters used in this discussion has been previously defined and described in conjunction with the DCT mathematics used to facilitate the inventive methods. FIG. 5B demonstrates the partitioning of a flat-field into 8×8 first segments. If the graph of FIG. 5A was expanded and mapped to FIG. 5B in two dimensions, the result would be ten two-dimensional curved surfaces, plus an average curved surface corresponding to the dotted line of FIG. 5A. Each element of each 8×8 first segment in FIG. 3B would map onto ten distinct first level normalized noise masks, plus the generic normalized noise mask of the average curved surface.

5. DCT Based Pyramid Image Representation

One problem with the above noise modeling scheme comes from the segmentation of the image. Clearly as described above, the first level normalized noise mask and LUT values are useful to characterize the intra-segment noise. However, the low frequency noise, with a wavelength which is long with respect to the segment size, cannot be modeled. To solve this problem, a hierarchical approach is employed in a pyramid noise reduction scheme. The noise is modeled at multiple levels using discrete cosine transforms of overlapped pixel blocks, whereby each level represents a scaled version of the DCT coefficients of the flat-fields. In other words, a pyramid representation of the flat-fields is constructed, then a lookup table and a normalized noise mask are generated for each level of the pyramid.

The procedure for building a pyramid for multi-level noise modeling is described for two levels in FIG. 4. This procedure could easily be expanded to any number of levels by duplicating the sequence of steps used to build the second level. The first level processing to generate first level scale factors and a first level generic normalized noise mask was previously described for blocks 200–214.

Figure 6A:
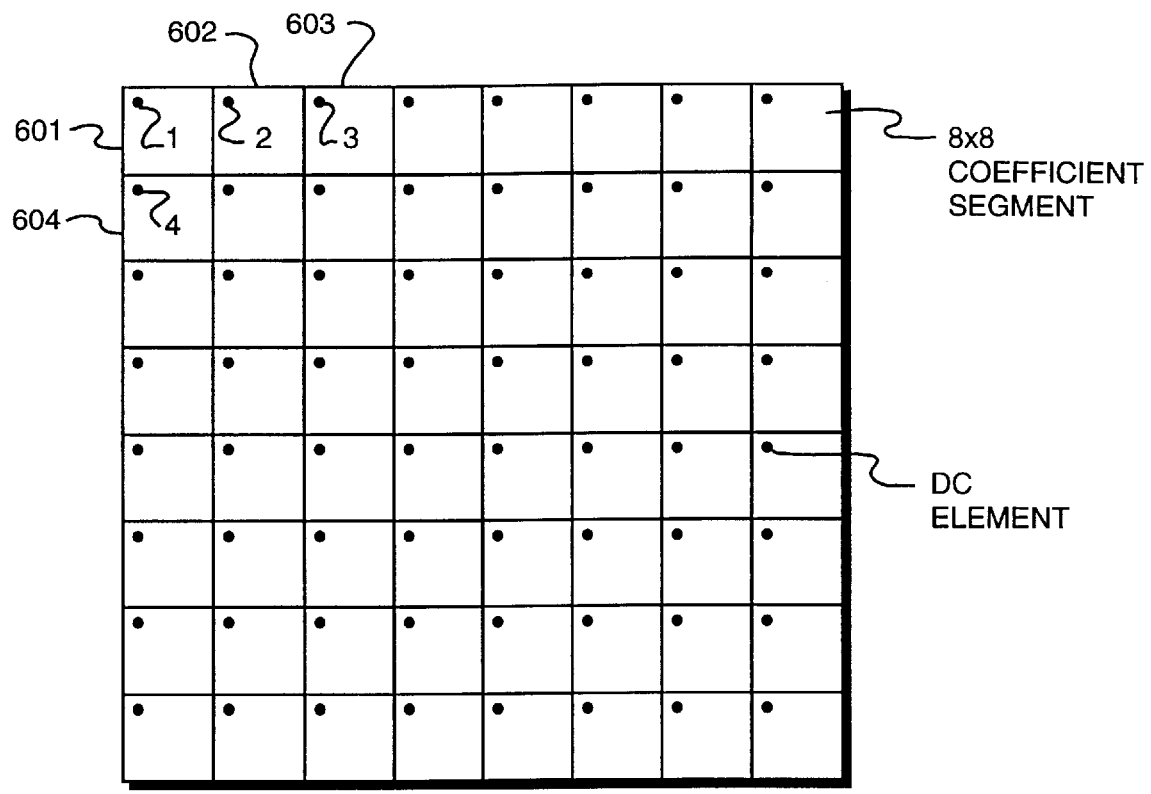
FIG. 6A is a representation of a 64×64 pixel image subdivided into 8×8 block segments with the upper left hand pixel of each segment depicted as a solid dot.
Figure 6B:
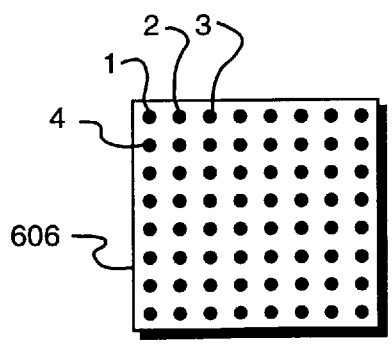
FIG. 6B is a downsampled version of FIG. 5A made up of the upper left hand pixels of each segment of FIG. 5A.

Continuing the previous example which used ten preselected flat-fields, the second level processing begins in block 414 where, for each flat-field, the first level DCT coefficients $S_1(v,u)$ are downsampled by taking preselected components, such as the first element $S_1(0,0)$ which is the DC element of each block, of each first segment and forming second level flat-fields which include only the preselected components from the first level DCT coefficients. The spatial ordering of the downsampled elements remains undisturbed. This downsampling scheme is illustrated in FIGS. 6A and 6B. FIG. 6A represents a first level flat-field which has been partitioned into overlapping 8×8 first segments and subjected to DCT transformation. FIG. 6B represents only the preselected components of FIG. 6A, i.e. the second level flat-field of downsampled DCT coefficients which forms one 8×8 second segment in this illustration. The term "second segment" is used throughout this application to identify any 8×8 second level segment. The preselected components 1 of 8×8 first segment 601 in FIG. 6A become the element 1 of 8×8 second segment 606 in FIG. 6B; the preselected components of first segment 602 become element 2 of second segment 606; the preselected components 3 of first segment 603 become element 3 of second segment 606; etc. The remainder of the first segments are downsampled in the same manner.

In block 416 second level DCT arrays $S_2(v,u)$ of DCT coefficients are generated by first partitioning the second level flat-field of FIG. 6B into overlapping 8×8 second segments, then taking the DCT of each overlapped second segment. Second level modified DCT arrays $S_{mod2}(v,u)$ are generated by setting the preselected components in $S_2(v,u)$ to zero. Second level noise power spectra are generated for the second segments by squaring the second level modified DCT coefficients in block 418. An average second segment power spectrum $P_{v2}(ave)$ is generated for each second level flat-field in block 420 by averaging corresponding elements of each first segment power spectrum in each second level flat-field. In block 422, a second level noise mask is generated for each second level flat-field by taking the square root of each element of the average second segment power spectrum for each flat-field. Each second level noise mask of a particular flat-field differs from that of another only by a second level LUT value, which is generated in block 424 for each second level flat-field by squaring each element of each second level noise mask, summing the squared elements of each second level noise mask, dividing the sum by 64 to produce a quotient, then taking the square root of the quotient. To generate a normalized second level noise mask in block 426 for each second level flat-field, each element of each second level noise mask generated in block 422 is divided by the corresponding second level LUT value, that is, the scale factor generated for the respective second level flat-field. Finally in block 428, a generic normalized second level noise mask is generated by averaging corresponding elements of each of the normalized second level noise masks. The above procedure could, of course, be repeated for additional pyramid levels if necessary. In general, it has been determined that three levels provide adequate noise removal results.

The above noise modeling procedure should most advantageously be applied to each luminance and chrominance channel. For a typical image signal source having one luminance and two chrominance channels, this amounts to the requirement of generating 9 lookup tables and 9 noise masks for a three level pyramid structure. Note that the lookup tables for both the luminance and the chrominance channels are indexed by the mean value of the luminance component since the mean of a chrominance component of any flat-field is expected to be zero, and the noise level in the chrominance components depends upon the overall intensity of the flat-field, i.e. the brightness of the object.

6. The Wiener Noise Filtering System of FIG. 7

Figure 7:
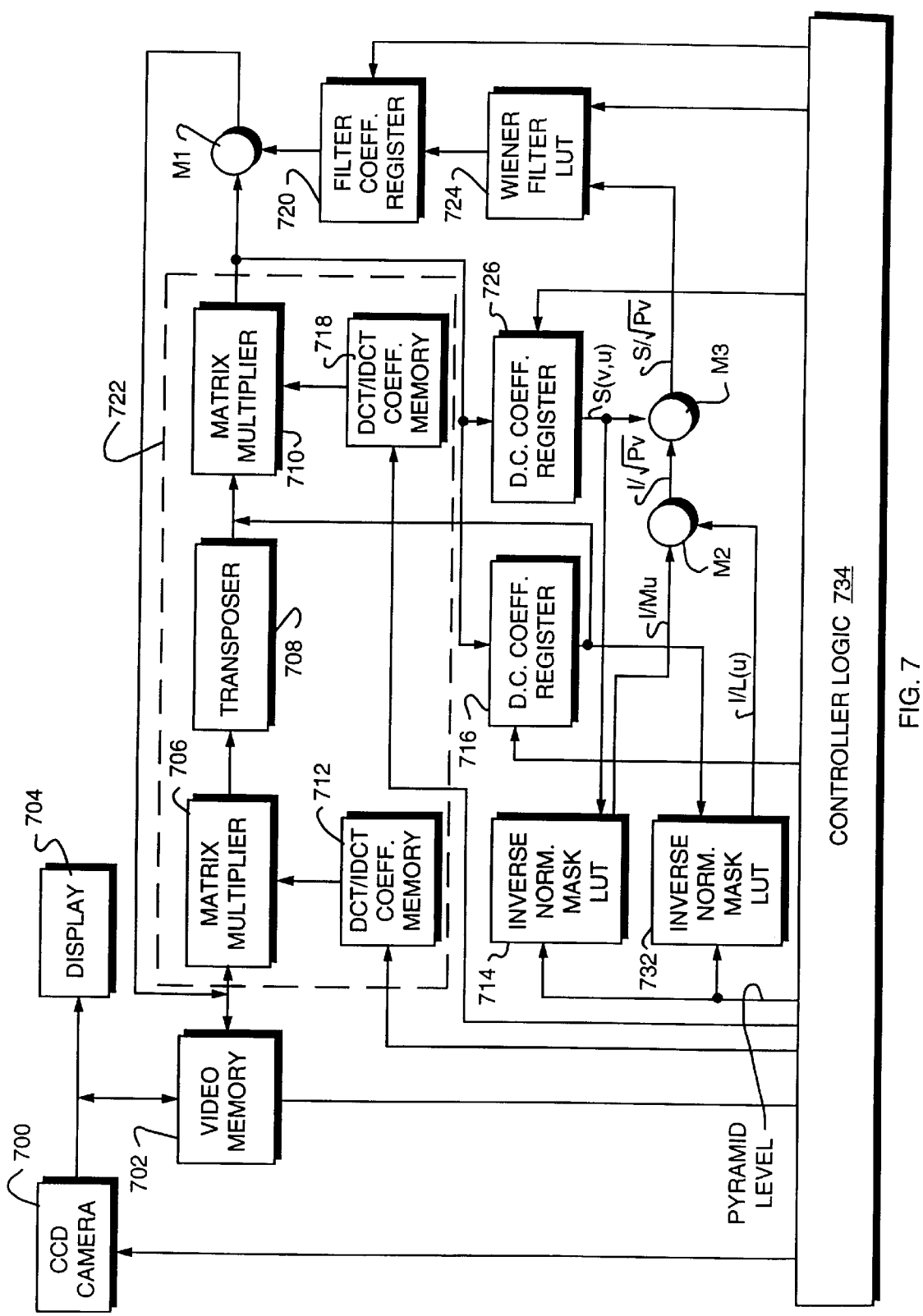
FIG. 7 is a detailed block diagram of the system of FIG. 1 for adaptive Wiener noise filtering.

The essential elements of an adaptive Wiener noise filter using a CCD digital still camera as an image signal source are depicted in FIG. 7. The filter system consists of a CCD camera 700, a video memory 702, an 8×8 block DCT processor 722, a DC coefficient register 716, an AC coefficient register 726, a filter coefficient register 720, an inverse normalized mask lookup table 714, an inverse luminance level lookup table 732, multipliers M1, M2, M3, Wiener filter lookup table 724, display 704 and controller logic 734. The DCT processor 722 includes two matrix multipliers 706, 710, two DCT/IDCT coefficient memories 712, 718 and a transpose memory 708. The input to the video memory 702 is the CCD camera 700 with associated lenses, shutter control, analog to digital converter, RGB to YUV converter, and timing circuits (not shown). The previously measured noise characteristics of the CCD 700 are stored in the inverse normalized mask LUT 714 and the inverse luminance level LUT 732. Both filtered and unfiltered images can be displayed on the digital monitor 704 which is connected to a serial port of the video memory 702.

Each YUV component is processed into three levels in DCT space as described in the following section entitled "Pyramid Image Representation". The image signal from the camera 700 is stored in the video memory 702 in raster scan format, so as to be compatible with the display 704. The format of the image signal is converted to overlapped 8×8 blocks by the controller 734 generating the appropriate addresses in the video memory 702. The DCT processor 722 converts the overlapped 8×8 blocks into frequency space. In this example, the preselected component of each block is the DC coefficient which is its average luminance value and which is stored in the DC coefficient register 716. It remains in the register 716 for the duration of the filtering operation of the remaining 63 AC coefficients of the block. Prior to filtering, each AC coefficient is stored temporarily in the AC coefficient register 726. The AC coefficient is held in the register 726 until it has been weighted by the filter value at which point it is written back into the video memory 702.

The output from the DC coefficient register 716, and the pyramid level serve as addresses to access the inverse luminance level LUT 732. The output from the AC coefficient register 726, and the pyramid level serve as addresses to access the inverse normalized mask LUT. The multiplier M2 forms the product of the retrieved inverse luminance value $1/L(u)$ and the retrieved inverse normalized noise mask value $1/Mu$. This product equals the inverse square root of the noise power $1/P_v^{1/2}$. The multiplier M3 forms the product of $1/P_v^{1/2}$ and the associated AC coefficient S. The ratio $S/P_v^{1/2}$ serves as the address to the Wiener filter LUT 724 which contains the precalculated filter function for the appropriate choices of predetermined tuning values $\alpha$ and $\beta$. The retrieved filter coefficient from the LUT 724 is stored temporarily in the filter coefficient register 720 where it can be retrieved and multiplied times the AC coefficient in multiplier M1 to form a weighted AC coefficient. The weighted AC coefficient is stored back into the video memory 702 and a new AC coefficient from the DCT processor 722 is passed to the AC coefficient register 726. When all 63 AC coefficients have been processed as described above, the original DC coefficient for the block is returned unmodified to the video memory 702. After all the blocks have been filtered, the DC coefficients stored in memory 702 represent a subsampled image for the second level of the pyramid. The second level is filtered in the same manner as the first level, and the DC coefficients of all of the overlapped 8×8 blocks of the second level together form the third level of the pyramid. Additional levels could be constructed if desired, although this example is limited to three pyramid levels.

The image is reconstructed in the manner outlined in the following section entitled "Image Restoration". The process begins by performing an IDCT on the filtered 8×8 blocks of the third level. This is accomplished by changing the predetermined matrices of the DCT/IDCT coefficient memories and passing each third level block through the DCT processor 722. The IDCT coefficients pass through the multiplier M1 unmodified and replace the DC coefficients of the second level blocks. When all the second level DC values have been restored, processing continues for reconstruction of the first level blocks. The IDCT is performed on the second level blocks to produce the first level blocks of IDCT coefficients, which in turn represent the reconstructed image. Of course throughout the above procedures, coefficients other than the DC coefficients can be chosen as the preselected components of each block. For instance, the preselected components could be defined in each block as the coefficients located at S(0,0), S(0,1) and S(1,0).

7. Operation Of The Noise Filtering System

In the past, an image has been represented at different frequency levels using a pyramid image representation whereby the frequencies of the electronic waveforms representing the image are subdivided into a different frequency band at each pyramid level. Noise modeling and subsequent noise reduction can then be performed at each level. One example of the use of such a pyramid image representation for image processing was introduced by Burt and Adelson in "The Laplacian Pyramid as a Compact Image Code", IEEE Trans. on COM, Vol. COM-31, No. 4, Apr. 1983, pp. 532–540 which describes the use of a Laplacian pyramid based on Laplacian transforms and which is incorporated by reference to provide non-essential background information which is helpful in appreciating the applications of the present invention. The Laplacian pyramid includes filtering and downsampling of an image from one level to another by application of a Laplacian filtering function. The result is a compact image representation which is useful for image coding. However, no one has disclosed or suggested structuring an image in a multi-level discrete cosine transform (DCT) pyramid image representation where each level of the pyramid is associated with a different DCT frequency band.

(i) Pyramid Image Representation

Figure 8A:
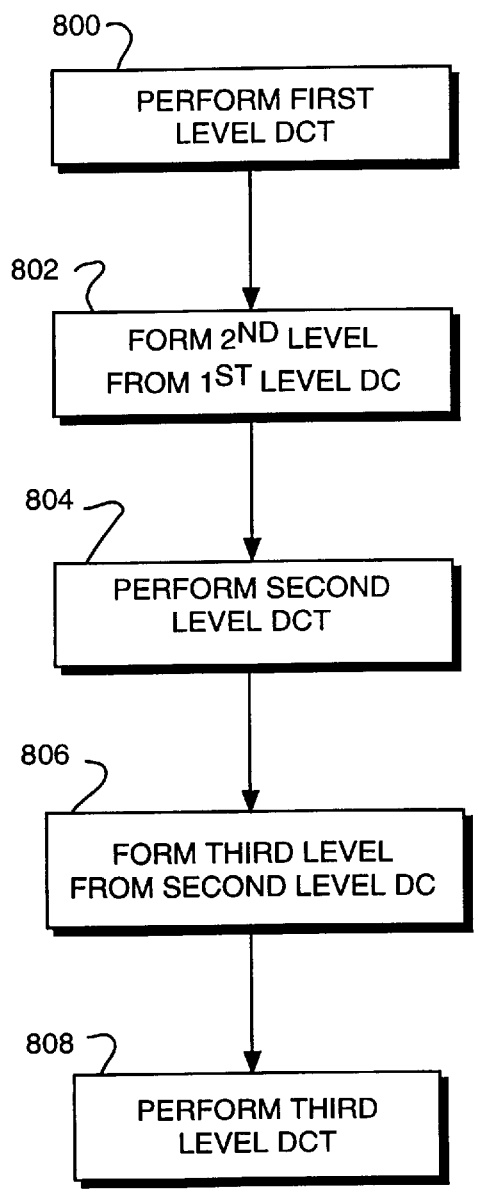
FIG. 8A is a block diagram of a three level pyramid image representation method applicable to the noise filtering system of FIG. 7.

When constructing the pyramid image representation as detailed by the steps of FIG. 8A, the image signal resident in the spatial domain is segmented at the first level in block 800 into overlapped 8×8 first level segments in accordance with JPEG compression standards, although other sized blocks can also be used.

A DCT is performed on each overlapped 8×8 first level segment to generate first level DCT coefficients which are stored in memory for each first level segment. In block 802, preselected components are the average first level DC (direct current) values located at the (0,0) position of each first level segment which are determined, ordered (as previously described in conjunction with FIGS. 6A and 6B) to provide a second level representation of the image signal, and then stored in memory. Each average first level DC value represents an average value of the 64 pixels of the corresponding first level segment. The second level representation of the image signal is then segmented in block 804 into overlapped 8×8 second level segments. A DCT is then performed on each second level segment to generate second level DCT coefficients which are stored in memory for each second level segment. In block 806, the preselected components, which in this case are the average second level DC values for each second level segment, are determined, ordered (as previously described in conjunction with FIGS. 6A and 6B) to provide a third level representation of the image signal, and then stored in memory. A DCT is then performed on each third level segment in block 808 to generate third level DCT coefficients which are stored in memory for each third level segment.

The above described procedure results in a DCT pyramid image representation having three levels. Each level consists of a plurality of DCT coefficients which can be partitioned into overlapping 8×8 segments. Each segment at each level includes both a singular DC value which represents an average DCT coefficient value for that segment, plus 63 AC (alternating current) coefficient values. Each level of DCT coefficients represents a different DCT frequency band of the image signal.

(ii) Wiener Variant Filtering

Figure 8B:
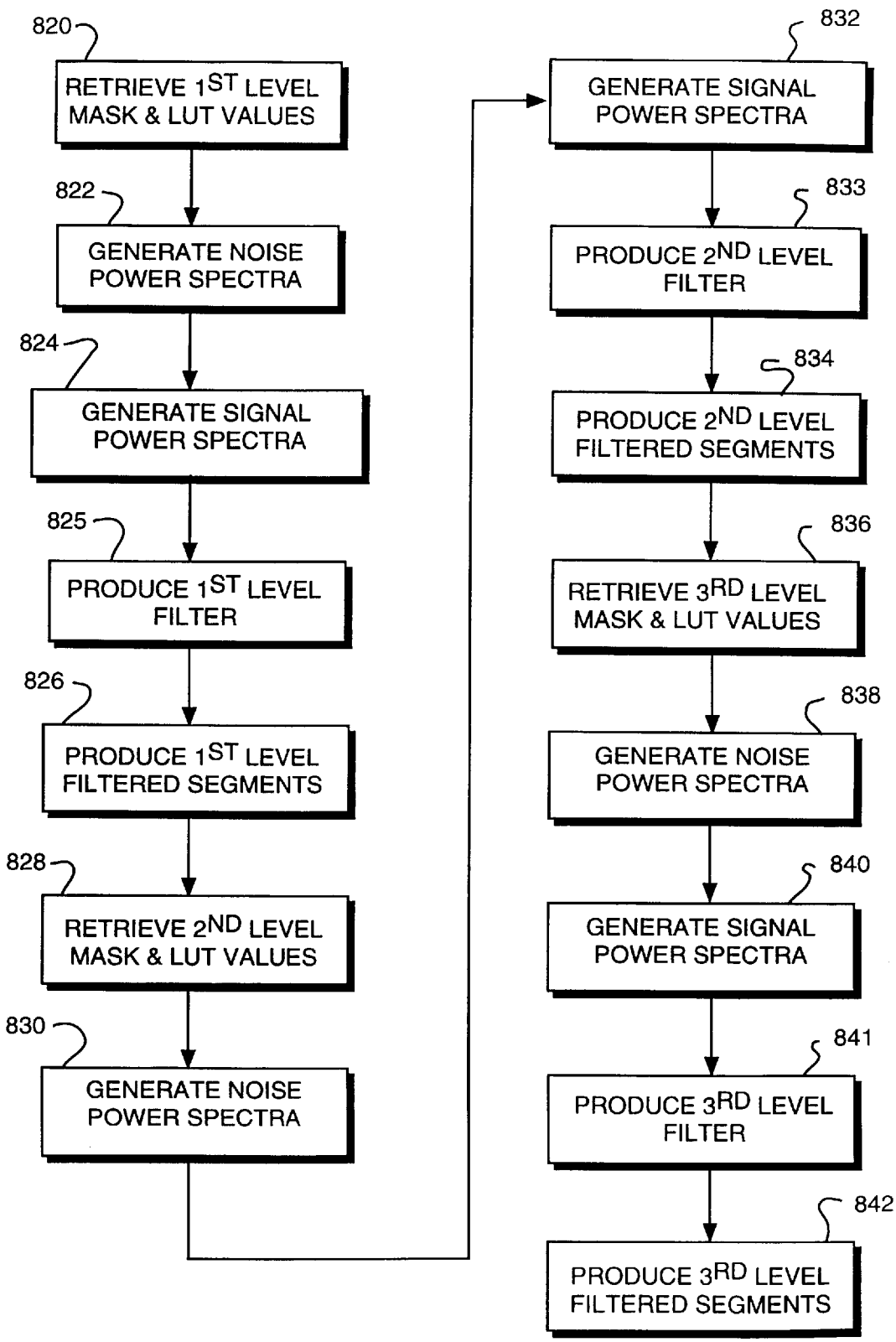
FIG. 8B is a block diagram of a Wiener variant filtering method applicable to the noise filtering system of FIG. 7.

Wiener filters are functions of Fourier transforms as previously discussed. However, a variant of the generalized Wiener filter of equation (9) can be implemented by replacing Fourier transforms with DCT transforms. In this way, DCT hardware can be utilized in a filtering device. The complete filtering method is described in detail according to the steps of FIG. 8B.

For our example, an image signal source has been subjected to noise modeling as previously discussed so that each of the three levels of the pyramid image representation has been provided with a predetermined generic normalized noise mask and a series of predetermined luminance dependent LUT values stored in memory. In block 820 a predetermined generic normalized first level noise mask and predetermined first level LUT values are retrieved from memory. The first level LUT values are multiplied times the generic normalized first level noise mask in block 822 to produce a first level noise mask. Thereafter the values of the first level noise mask are squared to produce the power spectrum $P_\nu(\omega 1, \omega 2)$ for each first level 8×8 segment. Then in block 824, a first level signal power spectrum $P_s(\omega 1, \omega 2)$ for each first level segment is generated by squaring the first level DCT coefficients of each first level segment. The filter for the first level segments is generated in block 825 in accordance with the DCT Wiener variant filter (see equation (9)) by first multiplying a predetermined value $\alpha$ times the first level noise power spectrum $P_\nu(\omega 1, \omega 2)$ to obtain a first filter product, $\alpha P_\nu(\omega 1, \omega 2)$, then adding the first filter product and the first level signal power spectrum $P_s(\omega 1, \omega 2)$ to obtain a first sum, $P_s(\omega 1, \omega 2)+\alpha P_\nu(\omega 1, \omega 2)$, then dividing the first sum into the first level signal power spectrum to provide a first quotient, and finally producing the first level filtered segment by raising the first quotient to the power of a predetermined value $\beta$. The first level filtered segments are generated in block 826 by element-by-element (mask) multiplication of the filter $H(\omega 1, \omega 2)$ times each segment.

The above procedure is repeated for the second level in blocks 828 through 834 and for the third level in blocks 836 through 842.

(iii) Image Restoration

Figure 8C:
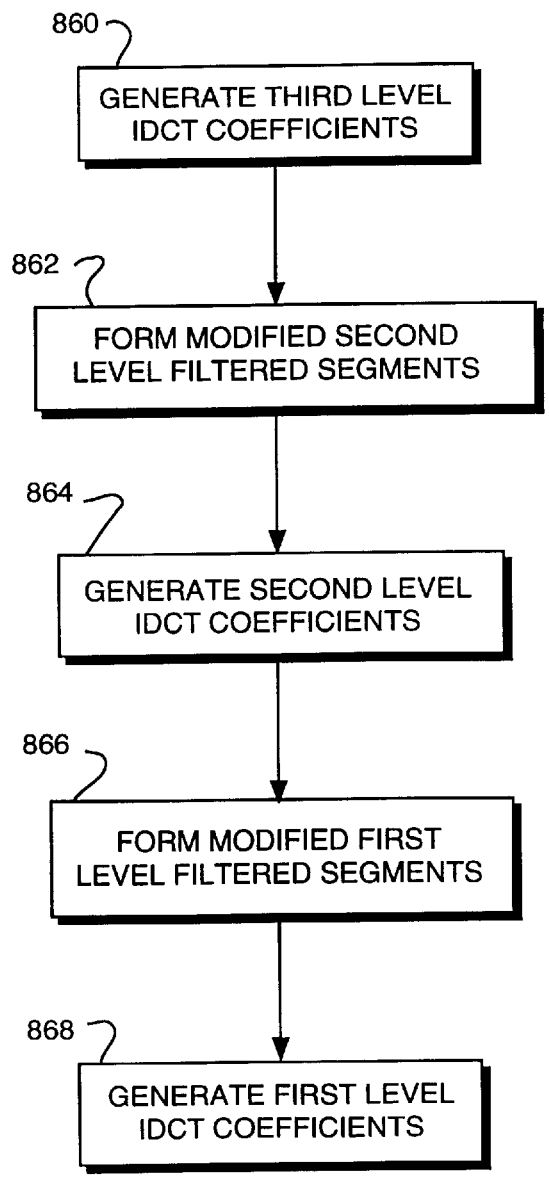
FIG. 8C is a block diagram of an image restoration method applicable to the noise filtering system of FIG. 7.

Once the DCT coefficients at each level of the pyramid image representation are filtered (for instance using a Wiener variant filter as described above) or otherwise processed, the processed image is ready to be restored according to the steps shown in the block diagram of FIG. 8C. In block 860, third level IDCT coefficients are generated by performing an IDCT on each third level 8×8 segment. Modified second level 8×8 filtered segments are generated in block 862 by retrieving the second level filtered segments from memory and replacing the second level DC values with corresponding third level IDCT coefficients. In block 864, second level IDCT coefficients are generated in 8×8 segments by performing an IDCT on each modified second level filtered segment. Modified first level 8×8 filtered segments are generated in block 866 by retrieving first level filtered segments from memory then replacing the first level DC values with corresponding second level IDCT coefficients. In block 868, first level IDCT coefficients are generated by performing an IDCT on each modified first level 8×8 filtered segment. The first level IDCT coefficients represent the restored image, i.e. the noise reduced image, for the processed luminance or chrominance channel. In order to account for the block overlapping during the generation of the DCT pyramid, unoverlapping must occur at each level during image restoration by discarding overlapped border regions and storing non-overlapped saved regions of blocks of IDCT coefficients at each level of the pyramid. The above procedure is repeated until noise reduction has been completed for each channel of the image signal source.

8. Another Preferred Embodiment

Figure 9:
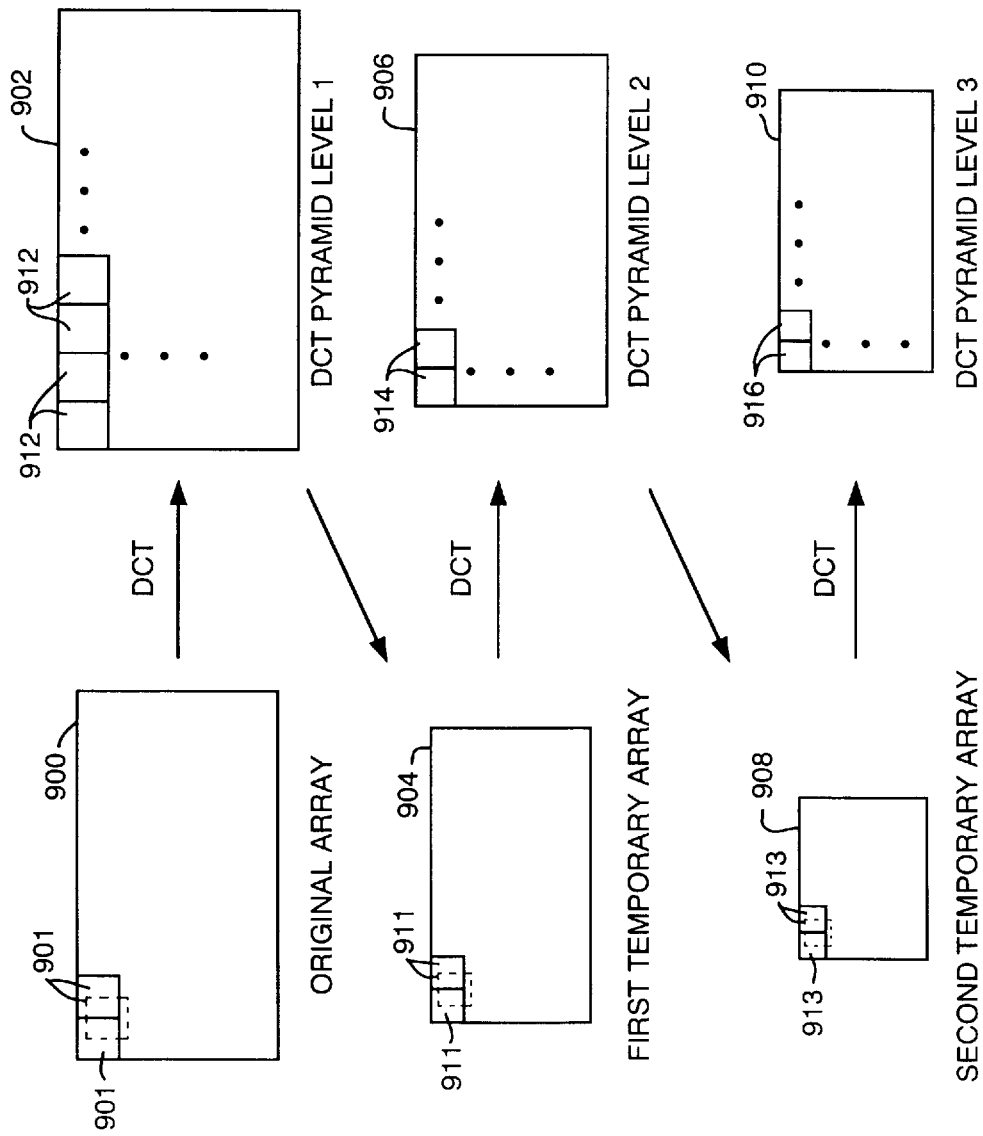
FIG. 9 is a diagrammatic representation of the structuring of the image into a three level DCT pyramid where each level of the pyramid is associated with a different DCT frequency band in accordance with the principles of the invention.
Figure 11:
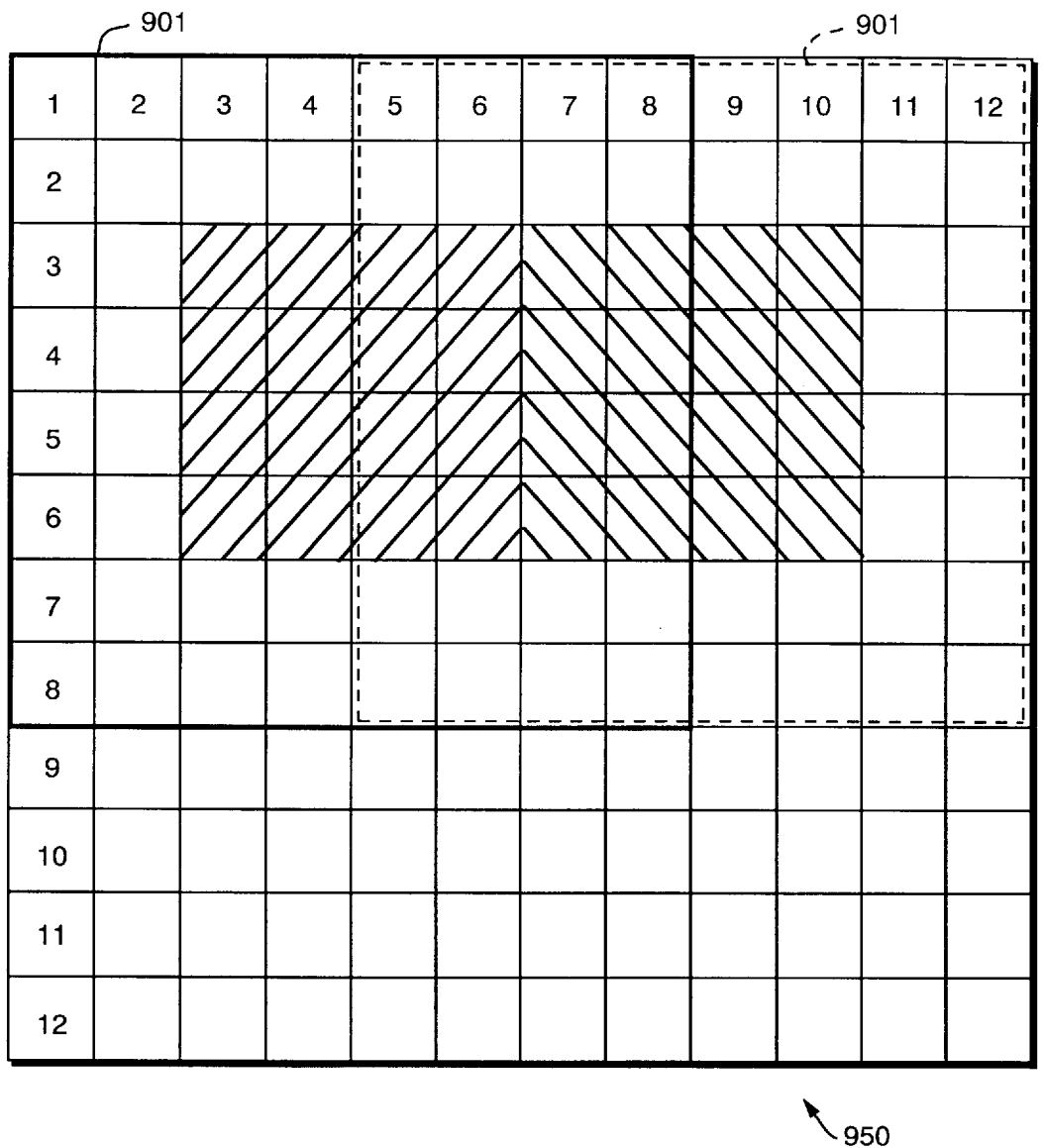
FIG. 11 illustrates one example of overlapping adjacent blocks of pixels.

FIG. 9 is a diagrammatic representation of the breakdown of the image into a three level DCT pyramid where each level is associated with a different DCT frequency band in accordance with the principles of the invention. An original image represented by an original array 900 of pixels is partitioned into 8×8 blocks 901 which are overlapped by four pixels along each edge of each block. FIG. 11 illustrates two overlapped 8×8 blocks 901 in a portion 950 of the image array 900. One 8×8 pixel block 901 of 64 pixels spans rows 1–8 and columns 1–8 as designated by the dark, solid line. Another 8×8 pixel block 901 of 64 pixels spans rows 1–8 and columns 5–12 as designated by the dotted line. The overlap region is shown as the area having pixels in both rows 1–8 and columns 5–8. Of course, the size of the blocks and the amount of overlap between adjacent blocks can be selected to meet whatever design criteria is specified. In this case, processing of the overlapped blocks yields a 4×4 section, i.e. the saved region, of processed pixels for each block as shown by the crosshatched regions. The remaining 2 pixel wide perimeter of each 8×8 block is discarded without being processed. Although the example of FIG. 11 shows overlapping of pixel blocks which are horizontally adjacent in the image portion 950, the same method applies to pixel blocks which are vertically adjacent.

Figure 12:
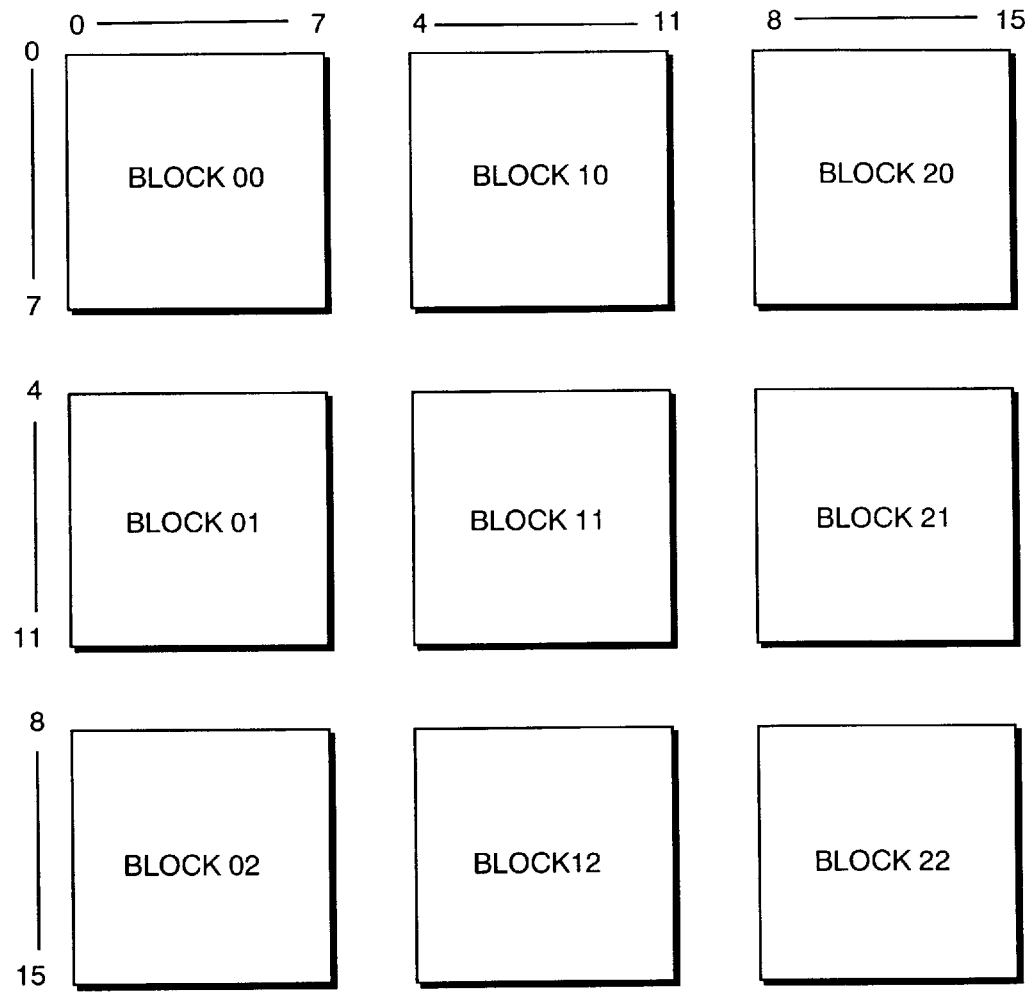
FIG. 12 is a diagrammatic representation of a group of 8×8 pixel blocks 00, 10, 20, 01, 21, 02, 12, and 22 which will overlap 8×8 pixel block 11 in a two-dimensional configuration.

Two dimensional overlapping is demonstrated in FIGS. 12–16 where blocks 00, 10, 20, 01, 11, 21, 02, 12 and 22 are each 8×8 pixel blocks in a 16×16 portion of the image array 900. FIG. 12 is a diagrammatic representation of all the 8×8 pixel blocks 00, 10, 20, 01, 21, 02, 12, and 22 which will overlap block 11. In this example, the horizontal and vertical overlap are equal. The overlap of block 00 occurs at pixels x={4, 5, 6, 7} and y={4, 5, 6, 7}. The overlap of block 10 occurs at pixels x={4, 5, 6, 7, 8, 9, 10, 11} and y={4, 5, 6, 7}. The overlap of block 20 occurs at pixels x={8, 9, 10, 11} and y={14, 5, 6, 7}. The overlap of block 01 occurs at pixels x={4, 5, 6, 7} and y={4, 5, 6, 7, 8, 9, 10, 11}. The overlap of block 21 occurs at x={8, 9, 10, 11} and y={4, 5, 6, 7, 8, 9, 10, 11}. The overlap of block 02 occurs at x={4, 5, 6, 7} and y={8, 9, 10, 11}. The overlap of block 12 occurs at x={4, 5, 6, 7, 8, 9, 10, 11} and y={8, 9, 10,11}. The overlap of block 22 occurs at x={8, 9, 10, 11} and y={8, 9, 10, 11}.

Figure 13A:
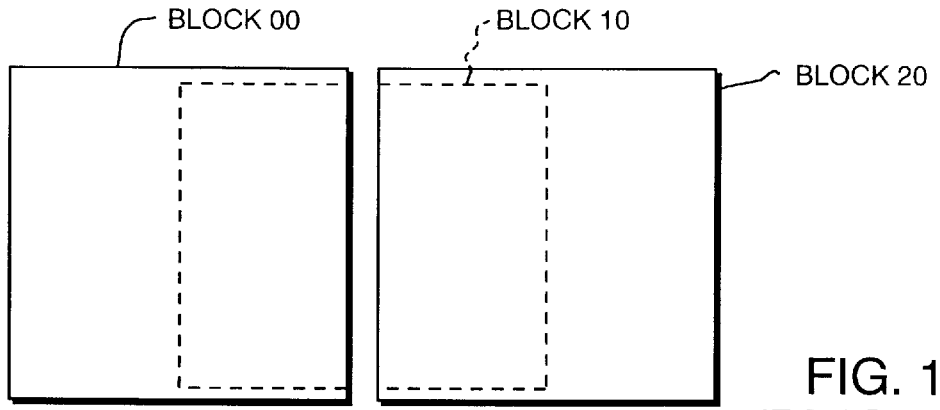
FIGS. 13A, 13B and 13C illustrate horizontal overlapping of blocks from FIG. 12.
Figure 13B:
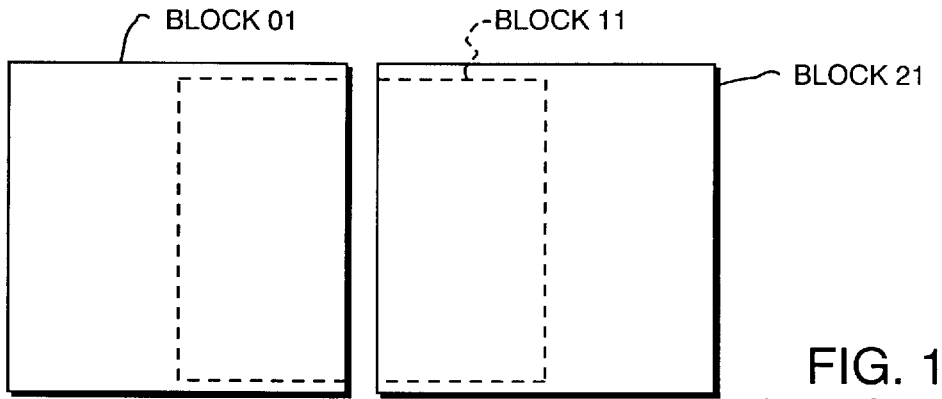
Figure 13C:
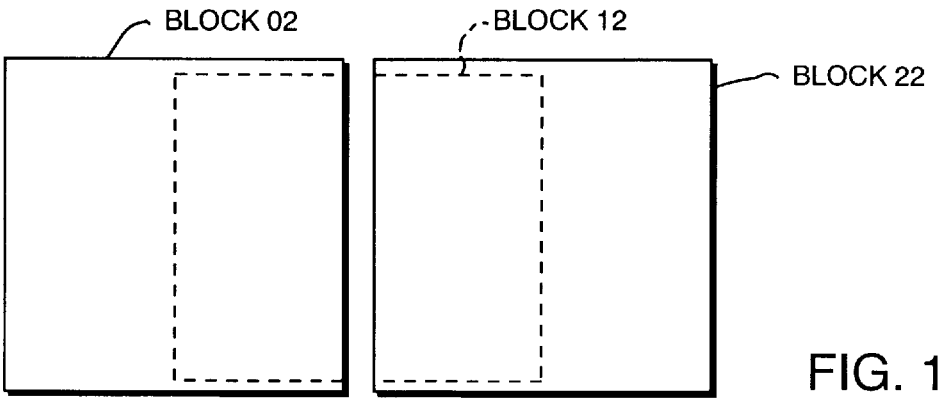
Figure 16:
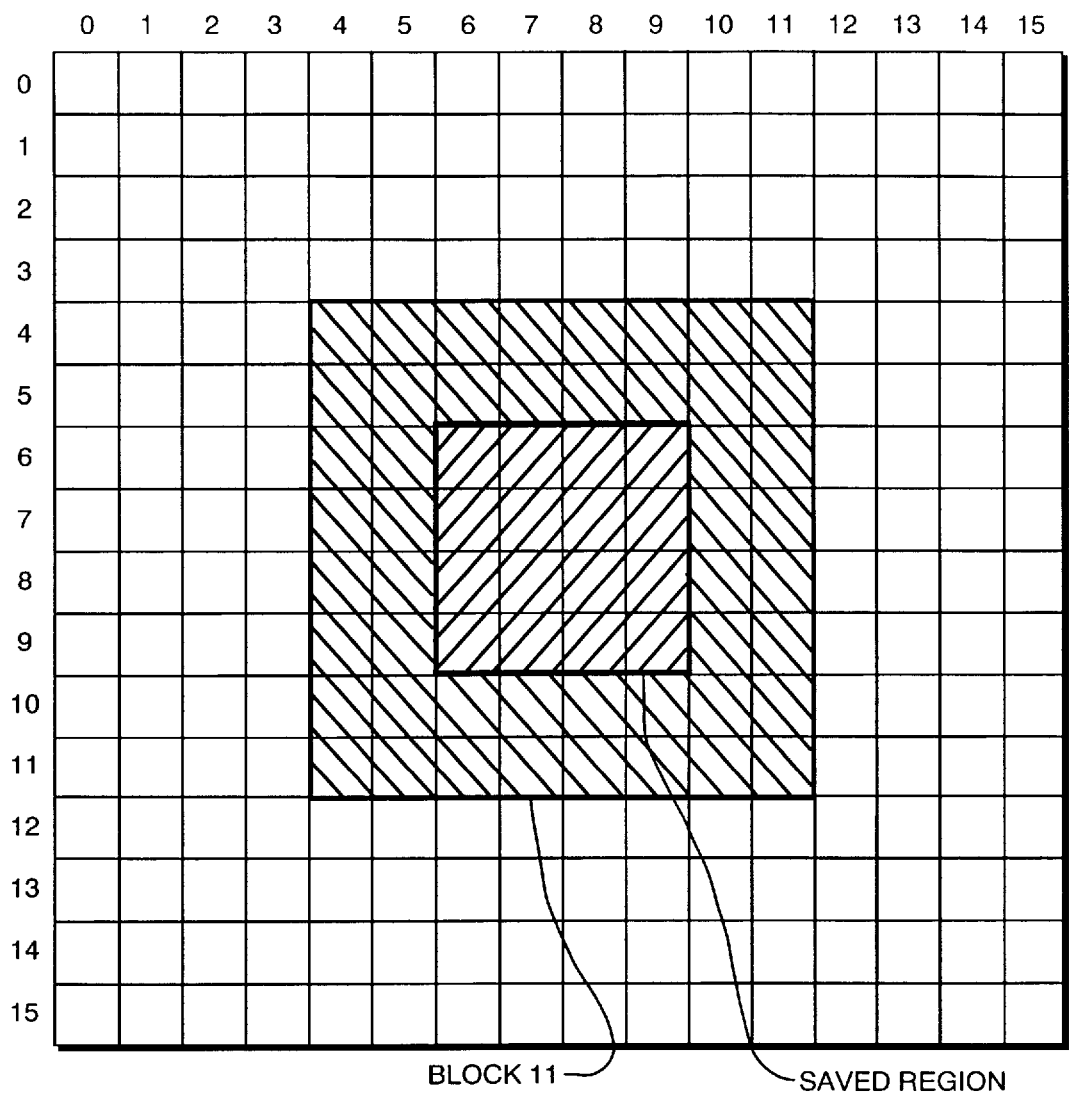
FIG. 16 illustrates the effect of both horizontal and vertical overlapping on block 11.

FIGS. 13A–13C illustrate the horizontal overlapping involved in the current example whereas FIGS. 14A–14C illustrate the vertical overlapping. FIG. 13A shows the horizontal overlapping of blocks 00, 10 and 20; FIG. 13B shows the horizontal overlapping of blocks 01,11 and 21; and FIG. 13C shows the horizontal overlapping of blocks 02, 12 and 22. FIG. 14A shows the vertical overlapping of blocks 00, 01 and 02; FIG. 14B shows the vertical overlapping of blocks 10,11 and 12; and FIG. 14C shows the vertical overlapping of blocks 20, 21 and 22. FIG. 15 illustrates the overlapping of all the blocks of FIG. 12 in both the horizontal and vertical directions. FIG. 16 illustrates the effect of both horizontal and vertical overlapping on block 11. The 4×4 pixel saved region where x=y={6, 7, 8, 9} is labeled in FIG. 16 and indicated by Xs in FIG. 15. The above-described overlapping technique is used throughout the generation of the DCT pyramid wherever overlapping is necessary or desired.

The generation of the DCT pyramid begins when a forward discrete even cosine transform is performed on each overlapped 8×8 block 901 to generate abutting 8×8 DCT blocks 912 (see FIG. 9) of first level DCT coefficients forming a first level 902 of the DCT pyramid. The first level 902 of the DCT pyramid is stored in memory for later use, and one or more preselected DCT coefficients of each DCT block 912 are stored in a first temporary array 904. Theoretically the preselected DCT coefficients can be chosen singly or in combination from any of the 64 DCT coefficients in a block 912. For instance, the preselected DCT coefficients could be the trio located at (0,0), (0,1) and (0,2), or they could be all the coefficients located in the second column, i.e. (0,2), (1,2) . . . (7,2). In a preferred embodiment, the preselected DCT coefficients are located at (0,0), i.e. the DC component, in each block. The coefficients selected from each of the blocks 912 are then ordered into overlapped blocks 911 in the first temporary array 914.

The first temporary array 904 is partitioned into 8×8 overlapped blocks 911 having a four pixel overlap along each border. A forward DCT is performed on each block 911 to generate abutting DCT blocks 914 of second level DCT coefficients forming a second level 906 of the DCT pyramid. The second level 906 of the DCT pyramid is stored in memory for later use and one or more DCT coefficients of each DCT block 914 are stored in a second temporary array 908. Preferably, the same locations for the preselected DCT coefficients are used for both the first and second levels of the DCT pyramid. The second temporary array 908 is then partitioned into 8×8 overlapped blocks 913 having a four pixel overlap along each border. A forward DCT is performed on each overlapped block 913 to generate abutting 8×8 DCT blocks 916 of third level DCT coefficients forming a third level 910 of the DCT pyramid. The above sequence of operations can be repeated for additional DCT pyramid levels if desired.

Each DCT pyramid level, as illustrated in FIG. 9, is associated with a different DCT frequency band. Thus after the DCT pyramid is generated, each pyramid level can be separately processed as desired by the user. For instance, each pyramid level could be subjected to a different filter specifically designed to remove artifacts present in that particular DCT frequency level. Furthermore, any number of image processing operations such as, but not limited to, filtering, sharpening, smoothing and edge detection, can be implemented on the various levels of the DCT pyramid structure.

Figure 10:
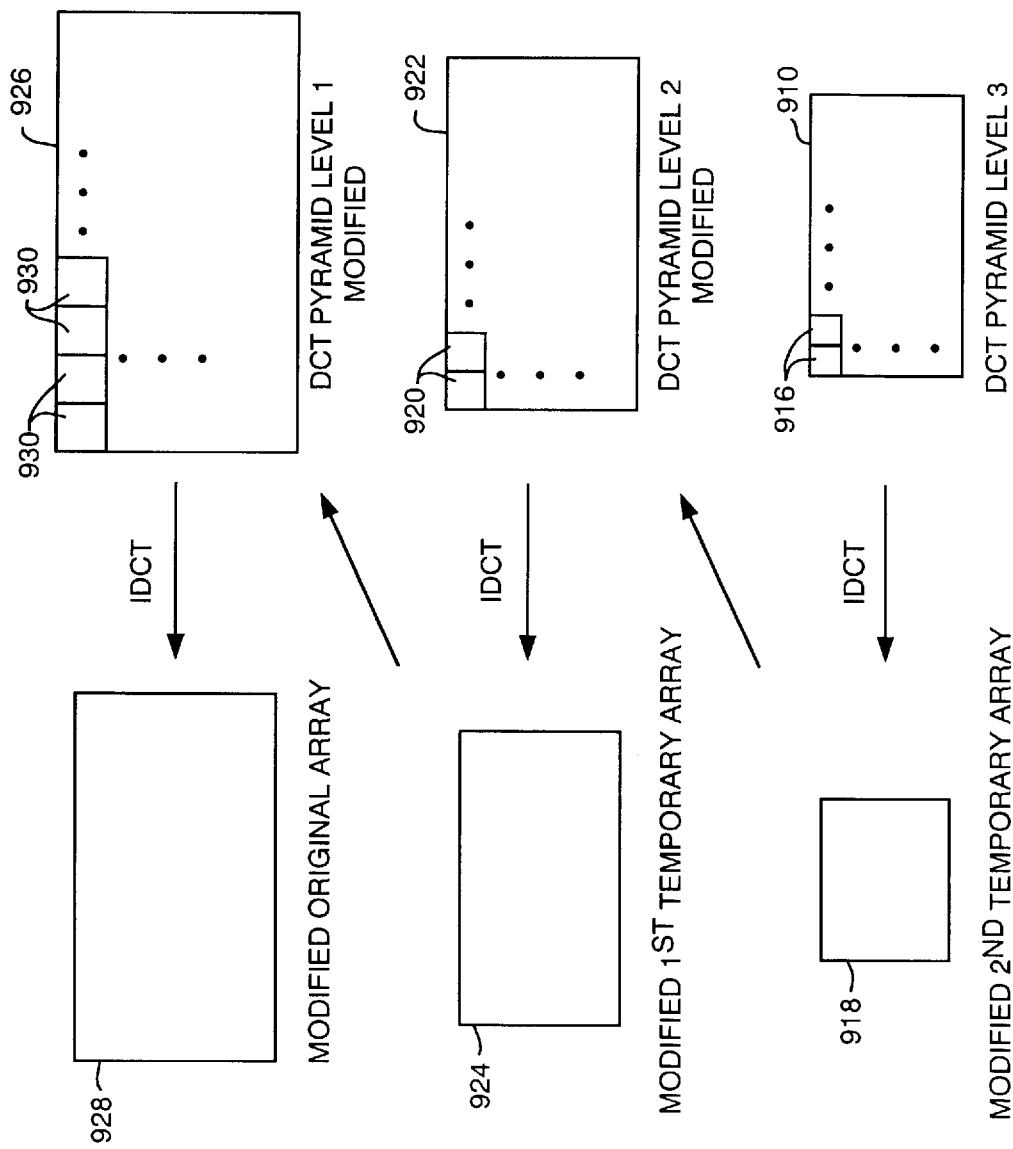
FIG. 10 is a diagrammatic representation of the restoration of the image, after processing, from the three level DCT pyramid of FIG. 9.

After processing of the DCT pyramid, image restoration begins as illustrated in FIG. 10 by taking an inverse discrete even cosine transform at the third level of the DCT pyramid on each abutting 8×8 block 916 of third level DCT coefficients to generate 8×8 overlapped blocks of third level IDCT coefficients. Border regions are discarded (to compensate for the overlapping of DCT coefficients in the second temporary array 908 during generation of the DCT pyramid as shown in FIG. 9), and the 4×4 saved regions of the third level IDCT coefficients are stored into a modified second temporary array 918 as illustrated in FIG. 10. Blocks 914 of second level DCT coefficients are retrieved from memory and the preselected components of the modified second temporary array 918, corresponding to the one or more DCT coefficients previously selected and stored in the second temporary array 908, are inserted into the retrieved blocks 914 to generate modified, retrieved, abutting 8×8 blocks 920 in the modified DCT pyramid level 2.

An IDCT is performed on each block 920 of the modified second level of the DCT pyramid to generate 8×8 overlapped blocks of second level IDCT coefficients. Border regions are discarded (to compensate for the overlapping of DCT coefficients in the first temporary array 904 during generation of the DCT pyramid), and the 4×4 saved regions of the second level IDCT coefficients are stored into a modified first temporary array 924. Blocks 912 of first level DCT coefficients are retrieved from memory and the preselected components of the modified first temporary array 924, corresponding to the one or more DCT coefficients previously selected and stored in the first temporary array 904, are inserted into the retrieved blocks 912 to generate modified, retrieved, abutting blocks 930 in the modified DCT pyramid level 1.

An inverse discrete even cosine transform (IDCT) is performed on each block 930 of the modified first level of the DCT pyramid to generate 8×8 overlapped blocks of first level IDCT coefficients. Border regions are discarded (to compensate for the overlapping of coefficients in the original array 900 during generation of the DCT pyramid), and the 4×4 saved regions of the first level IDCT coefficients are stored into a modified original array 928. The modified original array 928 corresponds to restored, modified pixels for producing the restored, modified image.

The above embodiments of the present invention are merely illustrative of the many possible specific embodiments and variations of the invention as claimed. For instance, a DCT pyramid can have any number of levels greater than or equal to two, pixel block sizes can vary, as can the amount of overlap between blocks. For creating additional pyramid levels, the above steps are repeated. Many other structural and operational equivalents of the claimed devices and methods are within the purview of the claims as understood by those of ordinary skill in the art.

We claim:

1. A method for structuring an image which corresponds to an original array of pixels, as a forward discrete even cosine transform (DCT) pyramid having a predetermined number of levels where each level is associated with a different DCT frequency band, the method comprising the steps of:

partitioning the original array into blocks of overlapped pixels;

taking a DCT of each block of overlapped pixels to generate blocks of first level DCT coefficients forming a first level of the DCT pyramid;

storing said first level of the DCT pyramid;

selecting and storing at least one of said first level DCT coefficients of each block of first level DCT coefficients into a first temporary array;

partitioning the first temporary array into blocks of overlapped coefficients; and taking a DCT of each block of overlapped coefficients of the first temporary array to generate blocks of second level DCT coefficients forming a second level of the DCT pyramid.

2. The method of claim 1 further comprising the steps of:

selecting and storing at least one of said second level DCT coefficients of each block of second level DCT coefficients into a second temporary array;

partitioning the second temporary array into blocks of overlapped coefficients; and taking a DCT of each block of overlapped coefficients of the second temporary array to generate blocks of third level DCT coefficients forming a third level of the DCT pyramid.

3. The method of claim 2 further comprising the steps of:

selecting and storing at least one of said third level DCT coefficients of each block of third level DCT coefficients into a third temporary array;

partitioning the third temporary array into blocks of overlapped coefficients; and taking a DCT of each block of overlapped coefficients of the third temporary array to generate blocks of fourth level DCT coefficients forming a fourth level of the DCT pyramid.

4. The method of claim 3 further comprising the steps of:

selecting and storing at least one of said fourth level DCT coefficients of each block of fourth level DCT coefficients into a fourth temporary array;

partitioning the fourth temporary array into blocks of overlapped coefficients; and taking a DCT of each block of overlapped coefficients of the fourth temporary array to generate blocks of fifth level DCT coefficients forming a fifth level of the DCT pyramid.

5. The method of claim 1 further comprising the step of independently processing each said level of the DCT pyramid, each said independent processing step selected from at least one of the group consisting of filtering, sharpening, smoothing, edge detecting, color adjusting and luminance adjusting.

6. The method of claim 1 further comprising the steps of:

taking an inverse discrete even cosine transform of each block of second level DCT coefficients which form the second level of the DCT pyramid, to generate blocks of second level IDCT coefficients;

discarding border regions and storing saved regions of said blocks of second level IDCT coefficients into a modified first temporary array to compensate for the overlapping of coefficients in the first temporary array;

retrieving said stored blocks of first level DCT coefficients;

inserting preselected components of said modified first temporary array, corresponding to said at least one of said first level DCT coefficients into said retrieved blocks of first level DCT coefficients to generate modified, retrieved blocks;

taking an inverse discrete even cosine transform of each said modified, retrieved block to generate blocks of first level IDCT coefficients; and discarding border regions and storing saved regions of said blocks of first level IDCT coefficients into a modified original array corresponding to a processed and restored said image.

7. A system for structuring an image which corresponds to an original array of pixels, as a forward discrete even cosine transform (DCT) pyramid having a predetermined number of levels where each level is associated with a different DCT frequency band, the system comprising:

means for partitioning the original array into blocks of overlapped pixels;

means for taking a DCT of each block of overlapped pixels to generate blocks of first level DCT coefficients forming a first level of the DCT pyramid;

means for storing said first level of the DCT pyramid;

means for selecting and storing at least one of said first level DCT coefficients of each block of first level DCT coefficients into a first temporary array;

means for partitioning the first temporary array into blocks of overlapped coefficients; and means for taking a DCT of each block of overlapped coefficients of the first temporary array to generate blocks of second level DCT coefficients forming a second level of the DCT pyramid.

8. The system of claim 7 further comprising:

means for selecting and storing at least one of said second level DCT coefficients of each block of second level DCT coefficients into a second temporary array;

means for partitioning the second temporary array into blocks of overlapped coefficients; and means for taking a DCT of each block of overlapped coefficients of the second temporary array to generate blocks of third level DCT coefficients forming a third level of the DCT pyramid.

9. The system of claim 7 further comprising:

means for selecting and storing at least one of said third level DCT coefficients of each block of third level DCT coefficients into a third temporary array;

means for partitioning the third temporary array into blocks of overlapped coefficients; and means for taking a DCT of each block of overlapped coefficients of the third temporary array to generate blocks of fourth level DCT coefficients forming a fourth level of the DCT pyramid.

10. The system of claim 9 further comprising:

means for selecting and storing at least one of said fourth level DCT coefficients of each block of fourth level DCT coefficients into a fourth temporary array;

means for partitioning the fourth temporary array into blocks of overlapped coefficients; and means for taking a DCT of each block of overlapped coefficients of the fourth temporary array to generate blocks of fifth level DCT coefficients forming a fifth level of the DCT pyramid.

11. The system of claim 7 further comprising means for independently processing each said level of the DCT pyramid.

12. The system of claim 11 wherein said independent processing means comprises means for filtering at least one said level of the DCT pyramid.

13. The system of claim 11 wherein said independent processing means comprises means for sharpening at least one said level of the DCT pyramid.

14. The system of claim 11 wherein said independent processing means comprises means for smoothing at least one said level of the DCT pyramid.

15. The system of claim 11 wherein said independent processing means comprises means for edge detection in at least one said level of the DCT pyramid.

16. The system of claim 7 further comprising:

means for taking an inverse discrete even cosine transform of each block of second level DCT coefficients which form the second level of the DCT pyramid, to generate blocks of second level IDCT coefficients;

means for discarding border regions and storing saved regions of said blocks of second level IDCT coefficients into a modified first temporary array to compensate for the overlapping of coefficients in the first temporary array;

means for retrieving said stored blocks of first level DCT coefficients;

means for inserting preselected components of said modified first temporary array, corresponding to said at least one of said first level DCT coefficients into said retrieved blocks of first level DCT coefficients to generate modified, retrieved blocks;

means for taking an inverse discrete even cosine transform of each said modified, retrieved block to generate blocks of first level IDCT coefficients; and means for discarding border regions and storing saved regions of said blocks of first level IDCT coefficients into a modified original array corresponding to a processed and restored said image.

* * * * *